(12) United States Patent
Hu et al.

(10) Patent No.: US 12,278,975 B2
(45) Date of Patent: Apr. 15, 2025

(54) VIDEO ENCODING AND DECODING METHOD AND APPARATUS BASED ON NON-ZERO COEFFICIENT ABSOLUTE LEVEL, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventors: Ye Hu, Shenzhen (CN); Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

(21) Appl. No.: 17/992,361

(22) Filed: Nov. 22, 2022

(65) Prior Publication Data

US 2023/0097724 A1 Mar. 30, 2023

Related U.S. Application Data

(63) Continuation of application No. PCT/CN2021/137186, filed on Dec. 10, 2021.

(30) Foreign Application Priority Data

Feb. 21, 2021 (CN) .......................... 202110194822.8

(51) Int. Cl.
H04N 19/176 (2014.01)
H04N 19/129 (2014.01)
H04N 19/46 (2014.01)

(52) U.S. Cl.
CPC ......... *H04N 19/176* (2014.11); *H04N 19/129* (2014.11); *H04N 19/46* (2014.11)

(58) Field of Classification Search
None
See application file for complete search history.

(56) References Cited

U.S. PATENT DOCUMENTS 8,526,495 B2 9/2013 Liu et al.
9,049,452 B2 6/2015 Liu et al.
(Continued)

FOREIGN PATENT DOCUMENTS

CN 109479132 A 3/2019
CN 110708552 A 1/2020
(Continued)

OTHER PUBLICATIONS

Piao et al., "CE7.1.3: Scan Region-based Coefficient Coding", 11. JVET Meeting; Jul. 11, 2018-Jul. 18, 2018; Ljubljana; (The Joint Video Exploration Team of ISO/IEC JTC1/SC29/WG11 and ITU-T SG. 16, Jul. 6, 2018, XP030199014, JVET-K0138.*
(Continued)

*Primary Examiner* — Edemio Navas, Jr.
(74) *Attorney, Agent, or Firm* — ANOVA LAW GROUP, PLLC

(57) ABSTRACT

A video encoding method includes: determining current coefficients to-be-decoded in a coding block of a video image frame; obtaining a flag combination corresponding to the current coefficients, the flag combination including at least two coefficient absolute level threshold flags; decoding the coefficient absolute level threshold flags in the flag combination to obtain values of the coefficient absolute level threshold flags; and determining the coefficient absolute levels of the current coefficients according to the values of the coefficient absolute level threshold flags.

14 Claims, 14 Drawing Sheets

(56) References Cited

U.S. PATENT DOCUMENTS

| | | | |
|---|---|---|---|
| 10,455,231 | B2 | 10/2019 | Xu et al. |
| 10,587,881 | B2 | 3/2020 | Xu et al. |
| 10,587,885 | B2 | 3/2020 | Ye et al. |
| 10,666,968 | B2 | 5/2020 | Xu et al. |
| 10,681,353 | B2 | 6/2020 | Moon et al. |
| 2013/0272423 | A1* | 10/2013 | Chien .................. H04N 19/176 375/240.18 |
| 2017/0094271 | A1 | 3/2017 | Liu et al. |
| 2021/0136385 | A1* | 5/2021 | Schwarz ................ H04N 19/13 |
| 2022/0078429 | A1 | 3/2022 | Kato et al. |
| 2022/0150501 | A1* | 5/2022 | Leleannec .............. H04N 19/18 |

FOREIGN PATENT DOCUMENTS

| | | |
|---|---|---|
| CN | 112995671 A | 6/2021 |
| WO | 2020006338 A1 | 1/2020 |
| WO | 2020051324 A1 | 3/2020 |
| WO | 2020250874 A1 | 12/2020 |

OTHER PUBLICATIONS

The World Intellectual Property Organization (WIPO) International Search Report for PCT/CN2021/137186 Mar. 16, 2022 7 Pages (including translation).

Gary J Sullivan et al., "Overview of the High Efficiency Video Coding (HEVC) Standard", 2012, vol. 22, No. 12 IEEE Transactions on Circuits and Systems for Video Technology.

Benjamin Bross et al. "Versatile Video Coding (Draft 2)", Jul. 10-18, 2018, ISO/IEC JTC1/SC29/WG11 JVET-K1001.

Benjamin Bross et al. "General Video Coding Technology in Responses to the Joint Call for Proposals on Video Compression with Capability beyond HEVC", 2019, vol. 30, No. 5, IEEE Transactions on Circuits and Systems for Video Technology.

Rajan Joshi et al. "High Efficiency Video Coding (HEVC) Screen Content Coding: Draft 4", Jun. 19-26, 2015, ISO/ISC JTC1/SC29/WG11 JCTVC-U1005. Part 1.

Rajan Joshi et al. "High Efficiency Video Coding (HEVC) Screen Content Coding: Draft 4", Jun. 19-26, 2015, ISO/IEC JTC1/SC29/WG11 JCTVC-U1005. Part 2.

Rajan Joshi et al. "High Efficiency Video Coding (HEVC) Screen Content Coding: Draft 4", Jun. 19-26, 2015, ISO/IEC JTC1/SC29/WG11 JCTVC-U1005. Part 3.

Shan Liu et al. "Overview of HEVC extensions on screen content coding", vol. 4. 2015, Cambridge University Press.

Rajan Joshi et al. "Screen content coding test model 1 (SCM 1)", JCTVC-Q1014, Valencia, Spain.

Shan Liu et al. "Hybrid global-local motion compensated frame interpolation for low bit rate video coding", p. 58-76, Journal of Visual Communication and Image Representation 14 (1).

Shan Liu et al. "Nonlinear motion-compensated interpolation for low-bit-rate video", Applications of Digital Image Processing XXIII 4115, 203-213.

"AVS3-PART2: Video (Draft)", AVS Work Group, Mar. 2020, China.

Yinji Piao et al., "CE7.1.3 : Scan Region-based Coefficient Coding", Jul. 10-18, 2018, Joint Video Experts Team (JVET) of ITU-T SG 16 WP 3 and ISO/IEC JTC 1/SC 29/WG 11, 11th Meeting: Ljubljana, SI.

The European Patent Office (EPO) The Extended European Search Report for 21926374.6 Apr. 25, 2024 13 Pages.

Piao (Samsung) Y et al., "CE7.1.3: Scan Region-based Coefficient Coding", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0138. Jul. 6, 2018 (Jul. 6, 2018), XP030199014, Retrieved from the Internet: URL:http://phenix.int-evry.fr/jvet/doc_end_user/documents/11_Ljubljana/wg11/JVET-K0138-v3.zip JVET-K0138.docx.

Lv, Zhuoyi, et al. "Scan region-based coefficient coding in AVS3." 2020 IEEE International Conference on Multimedia & Expo Workshops (ICMEW). IEEE, 2020.

"Test Model 11 for Versatile Video Coding (VTM 11)", 132. MPEG Meeting; Oct. 12, 2020-Oct. 16, 2020; Online; (Motion Picture Expert Group or ISO/IEC JTC1/SC29/WG11), No. n19813. Jan. 9, 2021 (Jan. 9, 2021), XP030291635, Retrieved from the Internet: URL: https://dms.mpeg.expert/doc_end_user/documents/132_OnLine/wg11/MDS19813_WG05_N00023.zip WG5_N0023_VTM11_TestModel.docx.

\* cited by examiner

VIDEO ENCODING AND DECODING METHOD AND APPARATUS BASED ON NON-ZERO COEFFICIENT ABSOLUTE LEVEL, COMPUTER-READABLE MEDIUM, AND ELECTRONIC DEVICE

RELATED APPLICATION(S)

This application is a continuation application of PCT Patent Application PCT/CN2021/137186 filed on Dec. 10, 2021, which claims priority to Chinese Patent Application No. 202110194822.8, entitled "VIDEO ENCODING METHOD AND APPARATUS, VIDEO DECODING METHOD AND APPARATUS, COMPUTER-READABLE MEDIUM, AND ELECTRONIC DEVICE" and filed with the National Intellectual Property Administration, PRC on Feb. 21, 2021, all of which are incorporated herein by reference in entirety.

FIELD OF THE TECHNOLOGY

The present disclosure relates to the field of video encoding and decoding, and in particular, to a video encoding method and apparatus, a video decoding method and apparatus, a computer-readable medium, and an electronic device.

BACKGROUND

In the video encoding process, the encoder side may perform transformation, quantization, and entropy coding on residual data between original video data and predicted video data and transmit the processed residual data to the decoder side. Due to the complex and diverse numerical distributions of residual data, the coding efficiency during encoding and decoding of residual data may be low, affecting the video compression performance.

SUMMARY

An objective of the present disclosure is to provide a video encoding method and apparatus, a video decoding method and apparatus, a computer-readable medium, and an electronic device, to overcome the technical problem of low video coding efficiency at least to a certain extent.

In one aspect, the present disclosure provides a video decoding method, the including: determining current coefficients to-be-decoded in a coding block of a video image frame, the current coefficients being non-zero coefficients determined according to a scan sequence within a scan region-based coefficient coding (SRCC) scan region of the coding block; obtaining a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2; and decoding the coefficient absolute level threshold flags in the flag combination to obtain values of the coefficient absolute level threshold flags; and determining the coefficient absolute levels of the current coefficients according to the values of the coefficient absolute level threshold flags.

In another aspect, the present disclosure provides a video decoding apparatus, the apparatus including: a memory storing computer program instructions; and a processor coupled to the memory and configured to execute the computer program instructions and perform: determining current coefficients to-be-decoded in a coding block of a video image frame, the current coefficients being non-zero coefficients determined according to a scan sequence within a scan region-based coefficient coding (SRCC) scan region of the coding block; obtaining a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2; decoding the coefficient absolute level threshold flags in the flag combination to obtain values of the coefficient absolute level threshold flags; and determining the coefficient absolute levels of the current coefficients according to the values of the coefficient absolute level threshold flags.

In yet another aspect, the present disclosure provides a video encoding method, the method including: determining coefficient absolute levels of current coefficients to-be-encoded in a coding block of a video image frame, the current coefficients being non-zero coefficients determined according to a scan sequence within a scan region-based coefficient coding (SRCC) scan region of the coding block; obtaining a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2; and determining values of the coefficient absolute level threshold flags in the flag combination according to a magnitude relationship between the current coefficient absolute level of the current coefficient and the corresponding coefficient absolute level threshold, and respectively encoding the coefficient absolute level threshold flags in the flag combination.

In yet another aspect, the present disclosure provides a video encoding apparatus, the apparatus including: a memory storing computer program instructions; and a processor coupled to the memory and configured to execute the computer program instructions and perform: determining coefficient absolute levels of current coefficients to-be-encoded in a coding block of a video image frame, the current coefficients being non-zero coefficients determined according to a scan sequence within a scan region-based coefficient coding (SRCC) scan region of the coding block; obtaining a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2; and determining values of the coefficient absolute level threshold flags in the flag combination according to a magnitude relationship between the current coefficient absolute level of the current coefficient and the corresponding coefficient absolute level threshold, and respectively encoding the coefficient absolute level threshold flags in the flag combination.

In yet another aspect, the present disclosure provides a computer-readable storage medium, storing a computer program, the computer program, when executed by a processor, implementing the methods in the technical solutions.

In yet another aspect, the present disclosure provides an electronic device, including: a processor; and a memory, configured to store executable instructions of the processor, the processor being configured to execute the executable instructions to perform the methods in the technical solutions.

In the technical solutions provided in the embodiments of the present disclosure, syntax elements used in encoding and decoding non-zero coefficient absolute levels in the scan region of the coding block are modified using the flag combination including a plurality of coefficient absolute level threshold flags, to improve the binarization, encoding and coding methods for the non-zero coefficient absolute levels in the scan region, thereby improving the efficiency of coefficient coding and further improving the video compression performance.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Figure 1:
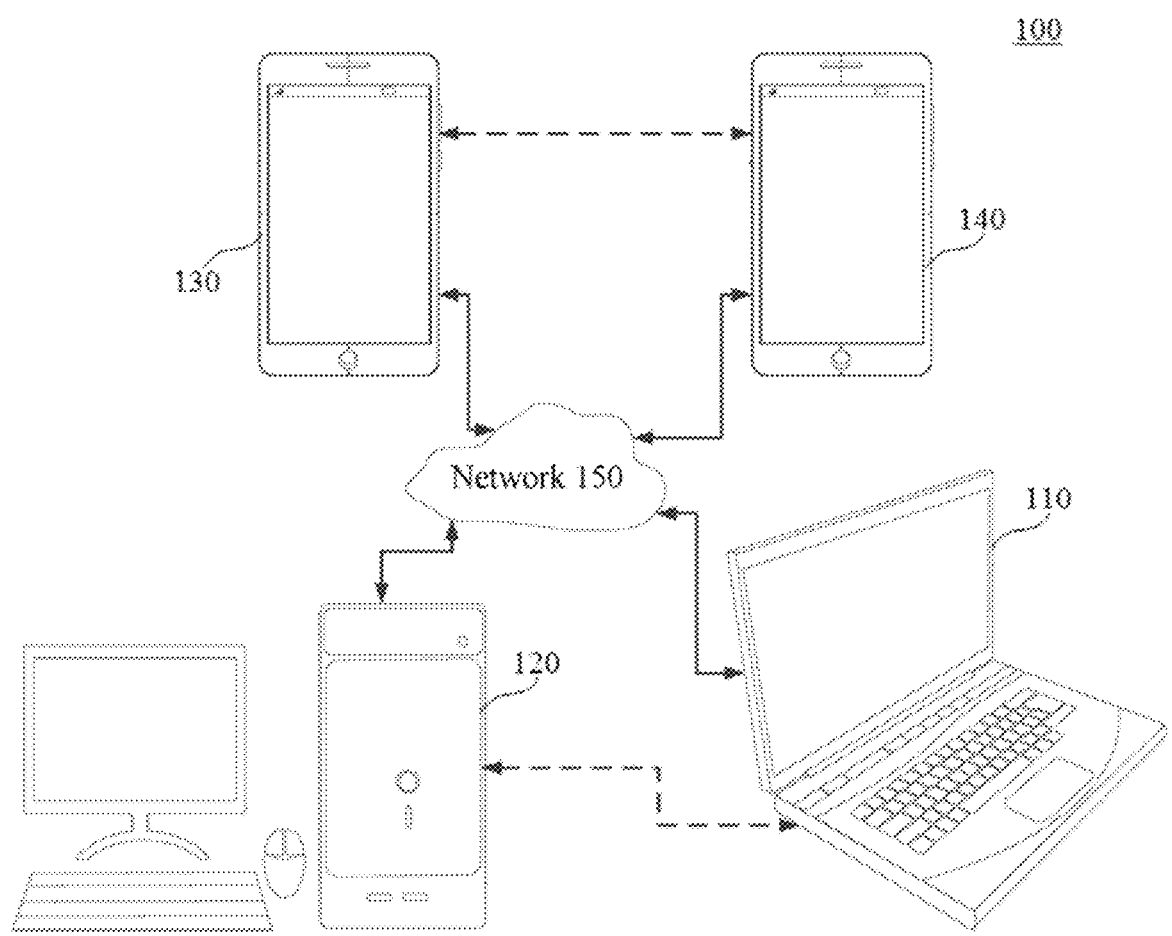
FIG. 1 is a schematic diagram of an exemplary system architecture according to certain embodiment(s) of the present disclosure.

FIG. 1 is a schematic diagram of an exemplary system architecture to which a technical solution in an embodiment of the present disclosure is applicable.

As shown in FIG. 1, a system architecture 100 includes a plurality of terminal apparatuses. The terminal apparatuses can communicate with each other through a network 150, for example. For example, the system architecture 100 may include a first terminal apparatus 110 and a second terminal apparatus 120 connected through the network 150. In the embodiment of FIG. 1, the first terminal apparatus 110 and the second terminal apparatus 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bit streams. The second terminal apparatus 120 may receive the coded video data through the network 150, decode the coded video data to recover the video data, and display a video picture according to the recovered video data.

In an embodiment of the present disclosure, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, one of the third terminal apparatus 130 and the fourth terminal apparatus 140 may code video data (for example, a video picture stream captured by the terminal apparatus) and transmit the coded video data to the other of the third terminal apparatus 130 and the fourth terminal apparatus 140 through the network 150. One of the third terminal apparatus 130 and the fourth terminal apparatus 140 may further receive coded video data transmitted by the other of the third terminal apparatus 130 and the fourth terminal apparatus 140, and may decode the coded video data to recover the video data and may display a video picture on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in the present disclosure may not be limited thereto. The embodiments disclosed in the present disclosure are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, for example, including a wired and/or wireless communication network. The communication network 150 may exchange data in a circuit switching channel and/or a packet switching channel. The network may include a telecommunication network, a local area network, a wide area network, and/or the Internet. For the purpose of the present disclosure, unless explained below, an architecture and a topology of the network 150 may be inessential to the operation disclosed in the present disclosure.

Figure 2:
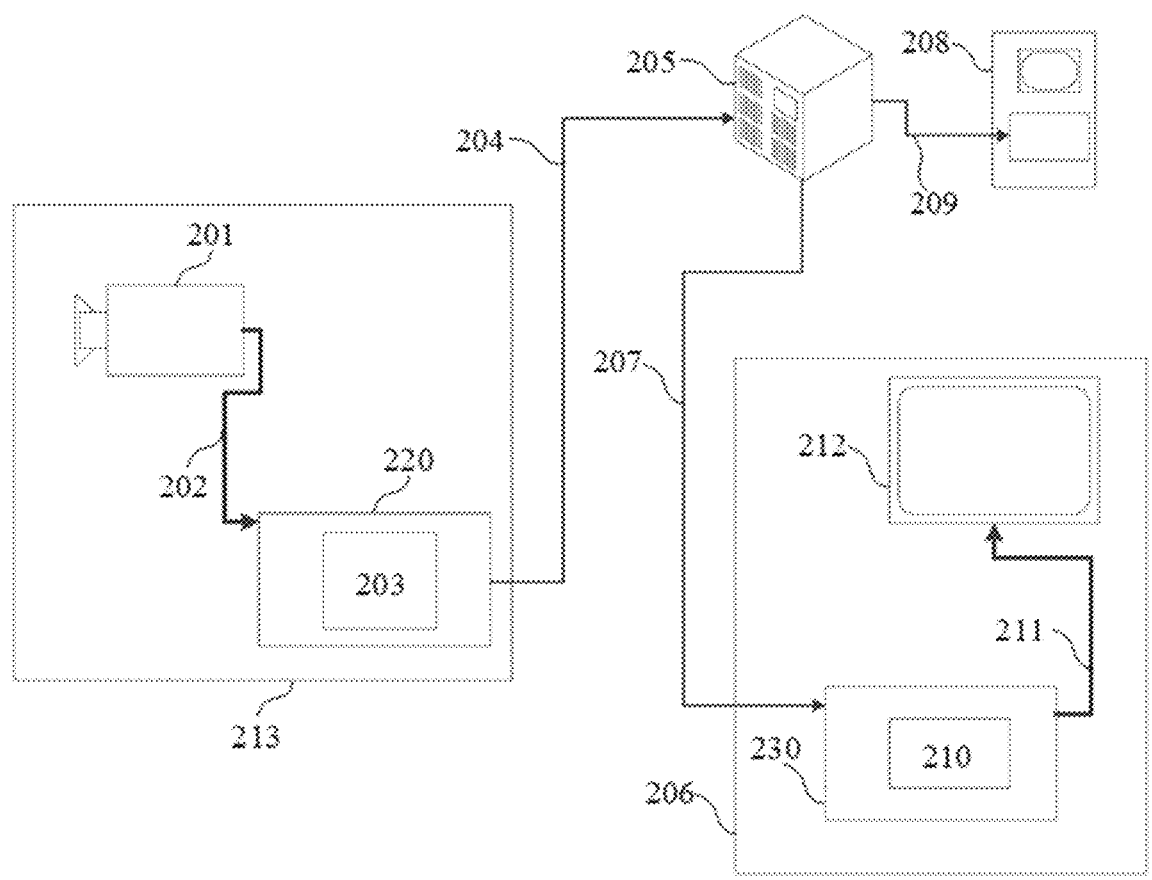
FIG. 2 is a schematic diagram of a placement manner of a video encoding apparatus and a video decoding apparatus in a streaming transmission system.

In an embodiment of the present disclosure, FIG. 2 shows a placement manner of a video encoding apparatus and a video decoding apparatus in a streaming transmission environment. The subject disclosed in the present disclosure may be comparably applicable to other video-enabled applications, including, for example, a video conference, a digital television (TV), and storage of compressed videos on digital media including a CD, a DVD, and a memory stick.

A streaming transmission system may include a capture subsystem 213. The capture subsystem 213 may include a video source 201 such as a digital camera. The video source creates an uncompressed video picture stream 202. In the embodiment, the video picture stream 202 includes a sample captured by the digital camera. Compared with the coded video data 204 (or a coded video bit stream 204), the video picture stream 202 is depicted by a thick line to emphasize the video picture stream with a large data volume. The video picture stream 202 may be processed by an electronic device 220. The electronic device 220 includes a video encoding apparatus 203 coupled to the video source 201. The video encoding apparatus 203 may include hardware, software, or a combination of hardware and software to realize or implement various aspects of the disclosed subject matter described in more detail below. Compared with the video picture stream 202, the coded video data 204 (or a coded video bit stream 204) is depicted by a thin line to emphasize the coded video data 204 with a small data volume (or a coded video bit stream 204), which may be stored on a streaming transmission server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 in an electronic device 230. The video decoding apparatus 210 decodes an incoming copy 207 of the coded video data and generates an output video picture stream 211 that can be presented on a display 212 (such as a display screen) or an other presence apparatus. In some streaming transmission systems, the coded video data 204, the video data 207, and the video data 209 (for example, the video bit stream) may be coded according to some video coding/compression standards. Embodiments of the standards include ITU-T H.265. In the embodiment, a video coding standard under development is informally referred to as versatile video coding (VVC). The present disclosure may be used in the context of the VVC standard.

The electronic device 220 and the electronic device 230 may include other components not shown in the figure. For example, the electronic device 220 may include a video decoding apparatus, and the electronic device 230 may further include a video encoding apparatus.

In an embodiment of the present disclosure, international video coding standards such as High Efficiency Video Coding (HEVC) and the VVC and the Chinese national video coding standard such as the Audio Video coding Standard (AVS) are used as examples. When a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned more finely to obtain one or more coding units (CU). The CU is the element in a coding process. Some concepts during coding of the CU are described below.

Predictive coding: The predictive coding includes modes such as intra prediction and inter prediction. After an original video signal is predicted by using a selected reconstructed video signal, a residual video signal is obtained. An encoder side is desired to select a predictive coding mode for a current CU and inform a decoder side. The intra prediction means that a predicted signal comes from a region that has been coded and reconstructed in a same image. The inter prediction means that the predicted signal comes from a coded image (referred to as a reference image) that is different from a current image.

Transform and Quantization: Transform operations such as Discrete Fourier Transform (DFT) and Discrete Cosine Transform (DCT) are performed on a residual video signal to convert the signal into a transform domain, which is referred to as a transform coefficient. A lossy quantization operation is further performed on the transform coefficient, which loses a specific amount of information, so that the quantized signal facilitates compressed expression. In some video coding standards, more than one transform mode may be selected. Therefore, the encoder side is also desired to select one transform mode for the current CU and inform the decoder side. Fineness of the quantization is generally determined by a quantization parameter (QP). A larger QP indicates that coefficients with a larger value range are to be quantized into a same output, which generally brings greater distortion and a lower bit rate. On the contrary, a smaller QP indicates that coefficients within a smaller value range are to be quantized into a same output, which generally brings less distortion and a higher bit rate.

Entropy coding or statistical coding: Statistical compression coding is performed on the quantized signal in the transform domain according to a frequency of occurrence of each value, and finally a binarized (0 or 1) compressed bit stream is outputted. In addition, entropy coding is also desired to be performed on other information generated during the coding, such as the selected coding mode and motion vector data, to reduce a bit rate. Statistical coding is a lossless coding manner that can effectively reduce a bit rate desired for expressing a same signal. A common statistical coding mode includes variable length coding (VLC) or context adaptive binary arithmetic coding (CABAC).

A context adaptive binary arithmetic coding (CABAC) process includes three steps: binarization, context modeling, and binary arithmetic coding. After binarization of inputted syntax elements, the binary data may be encoded by a regular encoding mode and a bypass coding mode. The bypass coding mode does not desire the assignment of a specific probability model to each binary bit, and an inputted binary bit bin value is directly encoded using a simple bypass encoder to speed up the entire encoding and decoding process. In general, different syntax elements are not completely independent, and the same syntax elements themselves have a certain memory. Thus, according to the conditional entropy theory, using other coded syntax elements for conditional coding can further improve the coding performance compared with independent coding or memoryless coding. Encoded symbolic information that is used as a condition is called a context. In the regular coding mode, binary bits of a syntax element sequentially enter a context modeler. The encoder allocates a suitable probability model for each inputted binary bit based on a value of a previously encoded syntax element or binary bit. This process is called context modeling. A context model corresponding to a syntax element can be located via ctxIdxInc (context index increment) and ctxIdxStart (context index start). After feeding the bin value and the allocated probability model together into a binary arithmetic encoder for encoding, the context model may be updated according to the bin value. This is an adaptive process in the encoding.

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which can effectively reduce a degree of distortion caused by quantization. Since the filtered reconstructed images are to be used as a reference for subsequently coded images to predict future image signals, the filtering operation is also referred to as loop filtering, that is, a filtering operation in a coding loop.

Figure 3:
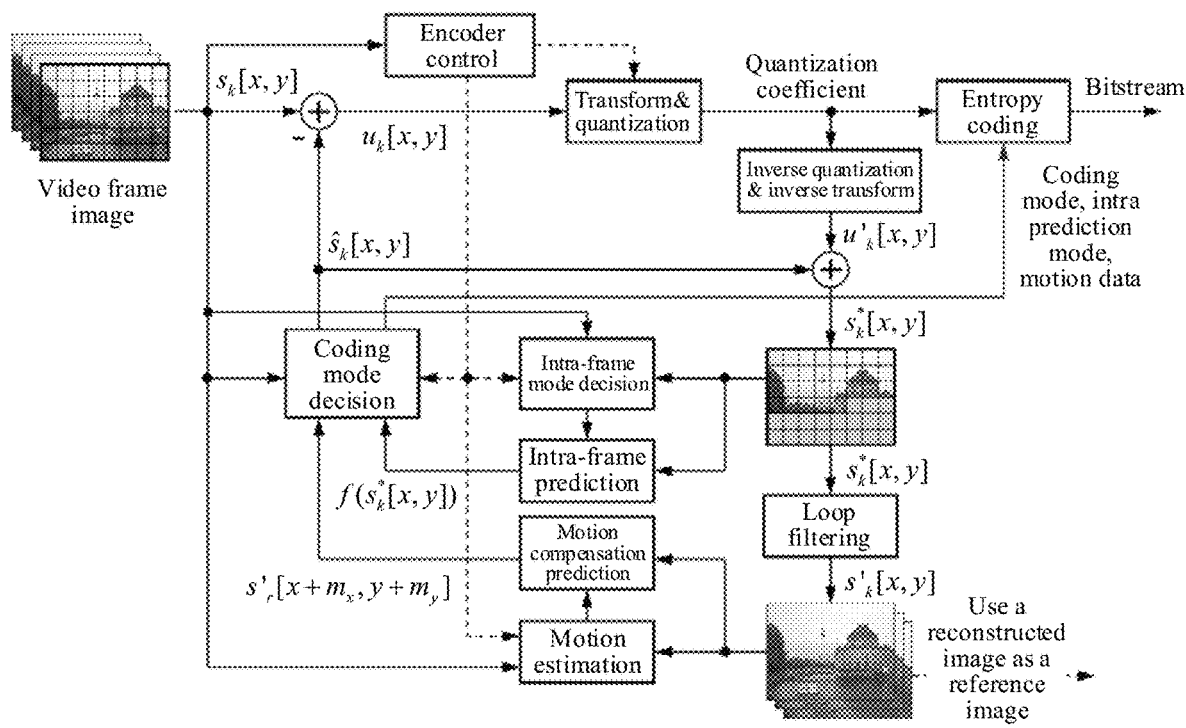
FIG. 3 is a schematic flowchart of a video encoder.

In an embodiment of the present disclosure, FIG. 3 is a flowchart of a video encoder. In this process, intra prediction is used as an example for description. A difference between an original image signal $s_k[x, y]$ and a predicted image signal $\hat{s}_k[x, y]$ is calculated to obtain a residual signal $u_k[x, y]$, and the residual signal $u_k[x, y]$ is transformed and quantized to obtain a quantization coefficient. The quantization coefficient is subjected to entropy coding to obtain a coded bit stream, and is further subjected to inverse quantization and inverse transform to obtain a reconstructed residual signal $u'_k[x, y]$. The predicted image signal $\hat{s}_k[x, y]$ is superimposed with the reconstructed residual signal $u'_k[x, y]$ to generate an image signal $s^*_k[x, y]$. The image signal $s^*[x, y]$ is inputted to an intra mode decision module and an intra prediction module for intra prediction, and is further subjected to loop filtering to output a reconstructed image signal $s'_k[x, y]$. The reconstructed image signal $s'_k[x, y]$ may be used as a reference image for a next frame for motion estimation and motion compensation prediction. A predicted image signal $\hat{s}_k[x, y]$ of the next frame is obtained based on a result $s'_r[x+m_x, y+m_y]$ of the motion compensation prediction and a result $f(s^*_k[x, y])$ of the intra prediction. The above process is repeated until the encoding is performed.

Based on the coding process, on the decoder side, for each CU, after a compressed bit stream is acquired, entropy decoding is performed to obtain various mode information and quantization coefficients. Inverse quantization and inverse transform are performed on the quantization coefficients to obtain a residual signal. Moreover, a predicted signal corresponding to the CU can be obtained according to coding mode information that is known. The residual signal may be added to the predicted signal to obtain a reconstructed signal. The reconstructed signal is subjected to operations such as loop filtering to generate a final output signal.

During the above coding and decoding, the transform processing performed on the residual signal causes energy of the residual signal to concentrate on few low-frequency coefficients, that is, most coefficients have relatively small values. After processing by a subsequent quantization module, the relatively small coefficient values become zero, which greatly reduces costs of coding the residual signal. However, due to diversified residual distribution, the DCT cannot adapt to all residual characteristics. Therefore, transform kernels such as DST7 and DCT8 are applied to the transform process, and horizontal transform and vertical transform of the residual signal can be performed by using different transform kernels. An adaptive multiple core transform (AMT) technology is used as an example. Possible transform combinations for transform processing of the residual signal include (DCT2, DCT2), (DCT8, DCT8), (DCT8, DST7), (DST7, DCT8), and (DST7, DST7). For one residual signal, a specific transform combination to be selected may be decided at the decoding end by using Rate-Distortion Optimization (RDO). In addition, when the residual distribution correlation within the residual block is weak, the residual signal may be directly quantified without being transformed, that is, the transformation is skipped. Whether the current residual block belongs to the transform skip mode may be explicitly encoded or implicitly exported.

Figure 4:
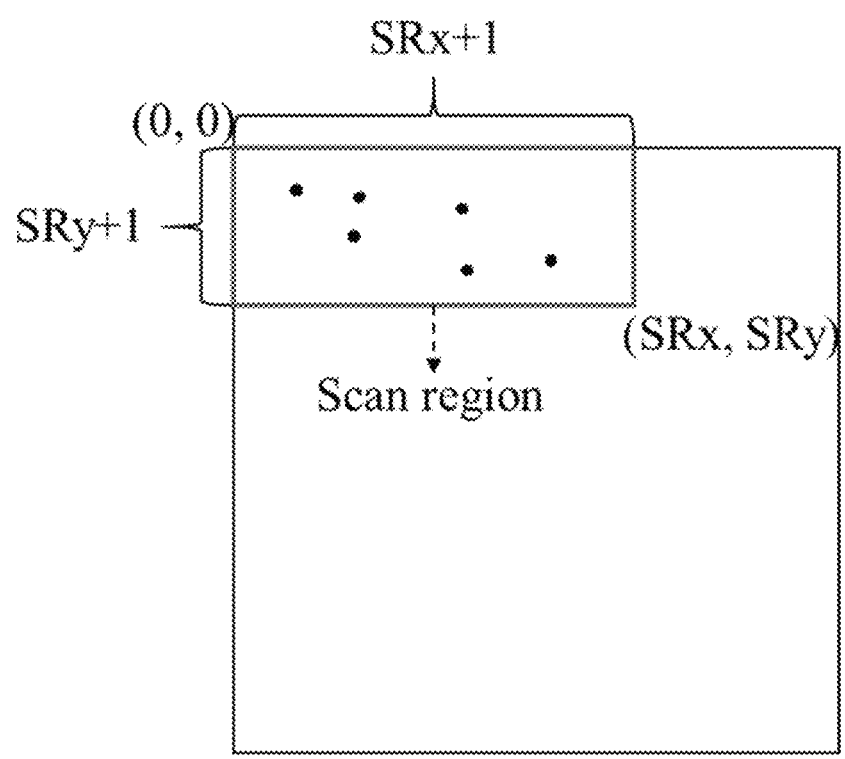
FIG. 4 shows a schematic scan region labeled by SRCC technique.
Figure 5:
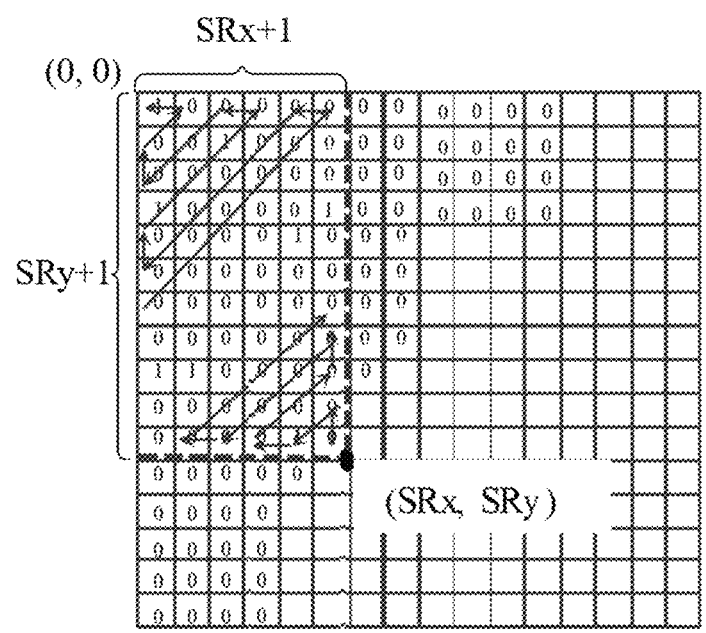
FIG. 5 shows a schematic diagram of a sequence of scanning a labeled scan region.

After transform and quantization of a residual signal nonzero coefficients in a quantization coefficient block are highly likely gather in a left area and an upper area of the block, and 0s generally appear in a right area and a lower area of the block. Therefore, an SRCC technology is introduced. Through the SRCC technology, it may be labeled that the size of an upper left area of nonzero coefficients included in each quantization coefficient block (having a size of W×H) is (SRx+1)×(SRy+1). SRx is a horizontal coordinate of a rightmost nonzero coefficient in a quantization coefficient block, SRy is a vertical coordinate of a lowermost nonzero coefficient in the quantization coefficient block, and coordinates of an upper left origin are (0, 0). $1 \leq SRx+1 \leq W$, and $1 \leq SRy+1 \leq H$. Coefficients outside the area are all 0. In the SRCC technology, a quantization coefficient area that may be scanned in one quantization coefficient block is determined by using (SRx, SRy). As shown in FIG. 4, only quantization coefficients in a scan region labeled by (SRx, SRy) may be coded. A scan order of coding is shown in FIG. 5, and may be an opposite Z shaped scan from the lower right corner to the upper left corner.

The coefficients to be coded within the SRCC region are coded using a hierarchical approach. In certain embodiment(s), first, coordinates of the SRCC scan region are encoded. Within the SRCC region, a flag (significant flag) that identifies whether the coefficient at the current position is 0 is encoded one by one based on the scanning order. Meanwhile, non-zero coefficient positions are recorded and the number of non-zero coefficients is calculated. If the number of non-zero coefficients is greater than 0, non-zero coefficient absolute levels and symbols at the corresponding positions may be encoded.

Table 1 shows a coefficient encoding process based on SRCC technology in an embodiment of the present disclosure. Bold fields with underscores represent syntax elements that may be decoded. Capitalized fields with no underscore represent variables. The values of the variables may be obtained by decoding the syntax elements. Some details not related to the present disclosure are omitted in the process in Table 1. Syntax elements involved in coding of each non-zero coefficient include coeff_abs_level_greater1_flag, coeff_abs_level_greater2_flag, coeff_abs_level_remaining, and coeff_sign.

TABLE 1

Coefficient encoding process based on SRCC technology in an embodiment of the present disclosure

```
if (SrccEnableFlag) {
    scan_region_x                                                               ae(v)
    scan_region_y                                                               ae(v)
    initScanOrder(ScanOrder, scan_region_x + 1, scan_region_y + 1,
blockWidth)
    lastScanPos = ((scan_region_x + 1) * (scan_region_y + 1)) − 1
    lastSet = lastScanPos >> 4
    is_last_x = 0
    is_last_y = 0
    escapeDataPresent = 0
    NumNonZeroCoeff = 0
    for(i = lastset; i >= 0; i−) {
        setPos = i << 4
        firstSigScanPos = 16
        lastSigScanPos = −1
        set_nz[i] = 0
        for(n = (i == lastSet ? lastScanPos − setPos : 15); n >= 0; n−− ) {
            blkpos = ScanOrder[ setPos + n ];
            sx = blkpos & (blockWidth − 1)
            sy = blkpos >> log2width
            if ((sx == 0 && sy == scan_region_y && is_last_y == 0) ||
(sy == 0 && sx == scan_region_x && is_last_x == 0)) {
                sig_flag[blkpos] = 1
            }
            else {
                sig_flag[blkpos]                                                ae(v)
            }
            if (sig_flag[blkpos]) {
                NumNonZeroCoeff = 0
                if (sx == scan_region_x) is_last_x = 1
                if (sy == scan_region_y) is_last_y =1
                if (lastSigScanPos == −1) lastSigScanPos = n
                firstSigScanPos = n
                set_nz[i]++
            }
        }
        if (set_nz[i]) {
            escapeDataPresent = 0
            for( n = (i == lastSet ? lastScanPos − setPos : 15); n >= 0;
n−− ) {
                blkpos = ScanOrder[setPos + n]
                if (sig_flag[blkpos]) {
                    coeff_abs_level_greater1_flag[blkpos]                       ae(v)
                    if (coeff_abs_level_greater1_flag[blkpos]) {
                        coeff_abs_level_greater2_flag[blkpos]                   ae(v)
                        if (coeff_abs_level_greater2_flag[blkpos]) {
                            escapeDataPresent = 1
                        }
                    }
                }
            }
        }
    }
    if (escapeDataPresent) {
        for(n = (i == lastSet ? lastScanPos − setPos: 15); n >= 0; n−− )
        {
            blkpos = ScanOrder[setPos + n]
            if (sig_flag[blkpos]) {
                base level = 3
                abs_coef[blkpos] = 1 +
```

TABLE 1-continued

Coefficient encoding process based on SRCC technology in an embodiment of the present disclosure

```
coeff_abs_level_greater1_flag[blkpos] + coeff_abs_level_greater2_flag[blkpos]
        if (abs_coef[blkpos] == base_level) {
                coeff_abs_level_remaining[blkpos]                              ue(v)
            abs_coef[blkpos] +=
coeff_abs_level_remaining[blkpos]
            }
          }
        }
      }
    }
    for n = (i == lastSet ? lastScanPos - setPos : 15) ; n >= 0; n -- ) {
      blkpos = ScanOrder[setPos + n]
      if (sig_flag[blkpos]) {
        coeff_sign [blkpos]                                                    ae(v)
      }
    }
  }
}
```

Table 2 shows a description of related descriptors involved in coefficient coding based on SRCC technology in an embodiment of the present disclosure. The descriptors are used to represent the parsing process of different syntax elements.

TABLE 2

Related descriptors of SRCC technology in an embodiment of the present disclosure

| Descriptor | Description |
|---|---|
| ae(v) | Syntax elements for advanced entropy coding. |
| b(8) | A byte that takes an arbitrary value. The parsing process is specified by a return value of a function read_bits(8). |
| f(n) | Consecutive n binary bits having a specific value. The parsing process is specified by a return value of a function read_bits(n). |
| i(n) | N-bit integer. In a syntax table, if n is "v", its digits are determined by values of other syntax elements. The parsing process is specified by the return value of the function read_bits (n). This return value is represented by a 2's complement where higher-order bits come first. |
| r(n) | Consecutive n '0s'. The parsing process is specified by a return value of a function read_bits(n). |
| se(v) | Signed integer syntax element, encoded with exponential Golomb code. |
| u(n) | N-bit unsigned integer. In a syntax table, if n is "v", its digits are determined by values of other syntax elements. The parsing process is specified by the return value of the function read_bits (n). This return value is represented by a binary number where higher-order bits come first. |
| ue(v) | Unsigned integer syntax element, encoded with exponential Golomb code. |

In the above embodiments, scan_region_x and scan_region_y represent the right-hand horizontal coordinate of the scan region and the lower vertical coordinate of the scan region respectively, and are used to determine a coefficient scan region. The coefficient scan region is a rectangular region with (0, 0) as the upper left corner and (scan_region_x, scan_region_y) as the lower right corner. Values of scan_region_x and scan_region_y are less than or equal to 31.

sig_flag is a non-zero coefficient flag for determining whether the current coefficient is a non-zero coefficient. sig_flag has a value of '0' indicating that the current coefficient is '0', and a value of '1' indicating that the current coefficient is a non-zero coefficient.

coeff_abs_level_greater1_flag is a flag indicating that the coefficient absolute level is greater than 1, and is used to determine whether the absolute level of the current coefficient is greater than 1. coeff_abs_level_greater1_flag has a value of '0' indicating that the absolute level of the current coefficient is '1', and a value of '1' indicating that the absolute level of the current coefficient is greater than 1.

coeff_abs_level_greater2_flag is a flag indicating that the coefficient absolute level is greater than 2, and is used to determine whether the absolute level of the current coefficient is greater than 2. The value of coeff_abs_level_greater2_flag being '0' means that the absolute level of the current coefficient is '2'. and a value of '1' indicating that the absolute level of the current coefficient is greater than 2.

coeff_abs_level_remaining is a coefficient absolute level remaining value, and is used to determine a remaining value of the absolute level of the current coefficient. If the current coefficient has the coefficient absolute level remaining value, the absolute level of the current coefficient may be 3+coeff_abs_level_remaining.

In an embodiment of the present disclosure, the ctxIdxInc of coeff_abs_level_greater1_flag or coeff_abs_level_greater2_flag or coeff_abs_level_greaterx_flag (where x is greater than or equal to 3) may be determined according to the following logic algorithm. Let the value of ctxIdxInc be 0;

if the current block is a chroma block, ctxIdxInc=ctxIdxInc+17;

record the position of the current coefficient in the current block as (pos_x, pos_y). The scan range is a rectangular area determined by (0, 0) and (sr_x, sr_y);

if pos_x is equal to sr_x and pos_y is equal to sr_y, and ctxIdxInc is the current value, break and skip the following remaining steps;
if the current block is a luma block, continue to execute the following logic;
if pos_x equals 0 and pos_y equals 0, skip processing ctxIdxInc;
otherwise, if the current block prediction mode is an ordinary intra prediction,
record i as a mapping value of pos_x relative to sr_x, record j as a mapping value of pos_y relative to sr_y, record s as a sum of the mapping values i and j, i=(pos_x<=sr_x/2)?(pos_x<=sr_x/4?0:1)?(pos_x<=sr_x*3/4?2:3); j=(pos_y<=sr_y/2)?(pos_y<=sr_y/4?0:1)?(pos_y<=sr_y*3/4?2:3); s=i+j;
if s<=1, ctxIdxInc+=4;
if s>2, ctxIdxInc+=8;
otherwise, ctxIdxInc+=12;
otherwise,
if pos_x<=sr_x/2, pos_y<=sr_y/2, pos_x does not equal to 0, and pos_y does not equal to 0, ctxIdxInc=ctxIdxInc+4;
otherwise, ctxIdxInc=ctxIdxInc+8.

If it is desirable to determine the ctxIdxInc of coeff_abs_level_greater1_flag, the number of non-zero coefficients corresponding to an absolute level greater than 1 among the first 5 coefficients decoded from the current block according to the scanning order is defined as num_gt1. If the number of non-zero coefficients decoded from the current block according to the scanning order is less than 5, only the number of coefficients corresponding to an absolute level greater than 1 among the decoded non-zero coefficients is calculated. ctxIdxInc+=num_gt1+1.

If it is desirable to determine the ctxIdxInc of coeff_abs_level_greater2_flag, the number of non-zero coefficients corresponding to an absolute level greater than 2 among the first 5 coefficients decoded from the current block according to the scanning order is defined as num_gt2. If the number of non-zero coefficients decoded from the current block according to the scanning order is less than 5, only the number of coefficients corresponding to an absolute level greater than 2 among the decoded non-zero coefficients is calculated. ctxIdxInc+=num_gt2+1.

If it is desirable to determine the ctxIdxInc of coeff_abs_level_greaterx_flag, the number of non-zero coefficients corresponding to an absolute level greater than x among the first 5 coefficients decoded from the current block according to the scanning order is defined as num_gtx. If the number of non-zero coefficients decoded from the current block according to the scanning order is less than 5, only the number of coefficients corresponding to an absolute level greater than x among the decoded non-zero coefficients is calculated. ctxIdxInc+=num_gtx+1.

Based on the above logic algorithm, context index increments of the corresponding plurality of coefficient absolute level threshold flags (that is, the flag coeff_abs_level_greater1 flag indicating that the coefficient absolute level is greater than 1 and the flag coeff_abs_level_greater2_flag indicating that the coefficient absolute level is greater than 2) may be calculated for each non-zero coefficient in the scan region of the coding block. In certain embodiment(s), an initial value of ctxIdxInc may first be determined from image channel information of the coding block. If the coding block is a luma block, the initial value of ctxIdxInc is determined to be 0. If the coding block is a chroma block, the initial value of ctxIdxInc is determined to be 17. The value of ctxIdxInc is further determined according to the relative position of the current coefficient in the scan region. Taking the reverse Z-shaped scanning order as an example, if the non-zero coefficient is located in the lower-right corner of the scan region (i.e., the first coefficient to be scanned and decoded), the current value of ctxIdxInc is maintained, i.e., the ctxIdxInc of the luma block is determined to be 0, and the ctxIdxInc of the chroma block is determined to be 17. If the non-zero coefficient is located in the upper left corner of the scan region (i.e., the last coefficient to be scanned and decoded), and the current coding block is a chroma block, the current value of ctxIdxInc is maintained, i.e., the value is 17. If the current coefficient is a coefficient at a position other than these two positions, the value of ctxIdxInc is adjusted according to the relative position of the current coefficient in the scan region. A specific adjustment method includes dividing the scan region into multiple local regions according to the coding prediction mode of the coding block, and adjusting the value of the ctxIdxInc according to the local region where the current coefficient is located. Finally, the calculated number num_gtx of coefficients of which the absolute levels are greater than the corresponding coefficient absolute level threshold x among the first 5 non-zero coefficients obtained by decoding and the adjusted value of ctxIdxInc are used to perform the assignment of ctxIdxInc, i.e., ctxIdxInc+=num_gtx+1. If the non-zero coefficient is located in the upper left corner of the scan region (i.e., the last coefficient to be scanned and decoded), and the current coding block is a luma block or a chroma block, the value of ctxIdxInc is adjusted according to num_gtx, i.e., ctxIdxInc+=num_gtx+1.

Taking the AVS3 standard as an example, the intra prediction modes include an ordinary intra prediction mode, an intra block copy (IBC) mode, and an intra string copy (ISC) mode. Depending on whether the coding block adopts ordinary intra prediction, the value of ctxIdxInc may be adjusted in different ways according to the distribution position of the current coefficient by using the method logic described above.

Taking the AVS3 standard as an example, ordinary transformation utilizes the correlation of residuals to concentrate the energy of residuals so that the energy is concentrated at a finite number of low-frequency coefficient positions as much as possible. The transform coefficients obtained by transformation often have the characteristic that most of them have a small value, i.e., most of the absolute levels of the non-zero coefficients are concentrated at 1 and 2. Therefore, in the AVS3 standard, the absolute levels of the non-zero coefficients may be encoded using the syntax elements coeff_abs_level_greater1_flag and coeff_abs_level_greater2_flag. For the transform skip mode, the energy is not concentrated through transformation, and the residual distribution characteristics are more complex and diverse. Compared with the transformed coefficients, the absolute level distribution of the non-zero coefficients of the coding block using the transform skip mode is not necessarily concentrated at 1 and 2, but there may be more large values. Therefore, using only the two syntax elements, coeff_abs_level_greater1_flag and coeff_abs_level_greater2_flag, cannot fully utilize the residual distribution characteristics of the coding block using the transform skip mode, resulting in a reduction in the coding efficiency.

According to the characteristics and diversity of the residual distribution in different coding modes, the present disclosure proposes a method for encoding non-zero coefficient absolute levels. Syntax elements used in encoding and decoding non-zero coefficient absolute levels in the SRCC region are modified, to improve the binarization, encoding and coding methods for the non-zero coefficient absolute levels in the SRCC region, thereby improving the efficiency of coefficient coding and further improving the video compression performance.

The coefficient encoding method proposed in the present disclosure is not limited to being applied to coefficient encoding in the transform skip mode, but may also be applied to coefficient encoding in other coding modes, for example, applied in coefficient encoding of all blocks, e.g., applied when a picture-level intra prediction transform skip enable flag picture_ist_skip_enable_flag has a value of 1, applied when a picture-level inter prediction transform skip enable flag picture_inter_transform_skip_flag has a value of 1, applied when picture_ist_skip_enable_flag and picture_inter_transform_skip_flag both have a value of 1, and so on.

In the embodiments of the present disclosure, whether to use the transform skip mode for the coding block may be determined by explicit encoding or implicit selection of transform skip. The explicit encoding means that before the coefficient absolute level is decoded, a flag used for indicating whether to use the transform skip mode for the coding block is decoded, and the decoding result of the flag explicitly indicates whether the current coding block may skip the transformation process. Implicit selection of transform skip means that when no corresponding flag exists, statistics are collected on decoding results of coefficients, and it is determined whether to skip the transformation process based on the statistical result. For example, all coefficients may be first obtained by decoding, the number of non-zero coefficients among all the coefficients is calculated, and the number of even coefficients among all the coefficients (including zero coefficients) is calculated. Whether to use the transform skip mode for the current coding block is implicitly deduced according to whether the number of non-zero coefficients is an even or odd number or whether the number of even coefficients among all the coefficients is an even or odd number (e.g., when the number of non-zero coefficients is an odd number, it is determined that transform skip has been used for the current coding block; when the number of non-zero coefficients is an even number, it is determined that transform skip has not been used for the current coding block; when the number of even coefficients among all the coefficients is an even number, it is determined that transform skip has been used for the current coding block; or when the number of even coefficients among all the coefficients is an odd number, it is determined that transform skip has not been used for the current coding block).

picture_ist_skip_enable_flag and picture_inter_transform_skip_flag are flags used for controlling whether implicit selection of transform skip can be used within/between frames. In the embodiments of the present disclosure, syntax elements related to the transform skip mode are explained below.

Implicit selection of transform skip enable flag ist_skip_enable_flag:

It is a binary variable. It has a value of '1' indicating that implicit selection of transform skip can be used; and a value of '0' indicating that implicit selection of transform skip is not to be used. The value of the variable IstSkipEnableFlag may be obtained by decoding the syntax element ist_skip_enable_flag. If the syntax element ist_skip_enable_flag does not exist in the bitstream, IstSkipEnableFlag may be assigned 0.

Inter transform skip enable flag inter_transform_skip_enable_flag:

It is a binary variable. It has a value of '1' indicating that inter transform skip can be used; and a value of '0' indicating that inter transform skip is not to be used. The value of the variable InterTransformSkipEnableFlag may be obtained by decoding the syntax element inter_transform_skip_enable_flag. If the syntax element inter_transform_skip_enable_flag does not exist in the bitstream, InterTransformSkipEnableFlag may be assigned 0.

Picture-level intra prediction transform skip enable flag picture_ist_skip_enable_flag:

It is a binary variable. It has a value of '1' indicating that the transform skip method can be used for a luminance intra predicted residual block and a luminance intra block copy predicted residual block of the current image; and a value of '0' indicating that the transform skip method is not to be used for the luminance intra predicted residual block and the luminance intra block copy predicted residual block of the current image. The value of the variable PictureIstSkipEnableFlag may be obtained by decoding the syntax element picture_ist_skip_enable_flag. If the syntax element picture_ist_skip_enable_flag does not exist in the bitstream, PictureIstSkipEnableFlag may be assigned 0.

Picture-level inter prediction transform skip enable flag picture_inter_trasform_skip_flag:

It is a binary variable. It has a value of '1' indicating that the transform skip method can be used for a luminance inter predicted residual block of the current image; and a value of '0' indicating that the transform skip method is not to be used for the luminance inter predicted residual block of the current image. The value of PictureInterSkipEnableFlag may be obtained by decoding the syntax element picture_inter_trasform_skip_flag. If the syntax element picture_inter_trasform_skip_flag does not exist in the bitstream, PictureInterSkipEnableFlag may be assigned 0.

Picture-level transform skip enable flag picture_ts_enable_flag:

It is a binary variable. It has a value of '1' indicating that the transform skip method can be used for the current image; and a value of '0' indicating that the transform skip method is not to be used for the current image. The value of PictureTsEnableFlag may be obtained by decoding the syntax element picture_ts_enable_flag. If the syntax element picture_ts_enable_flag does not exist in the bitstream, PictureTsEnableFlag may be assigned 0.

The implementation details of the technical solutions of the embodiments of the present disclosure are described in detail below with reference to specific implementation scenarios.

Figure 6:
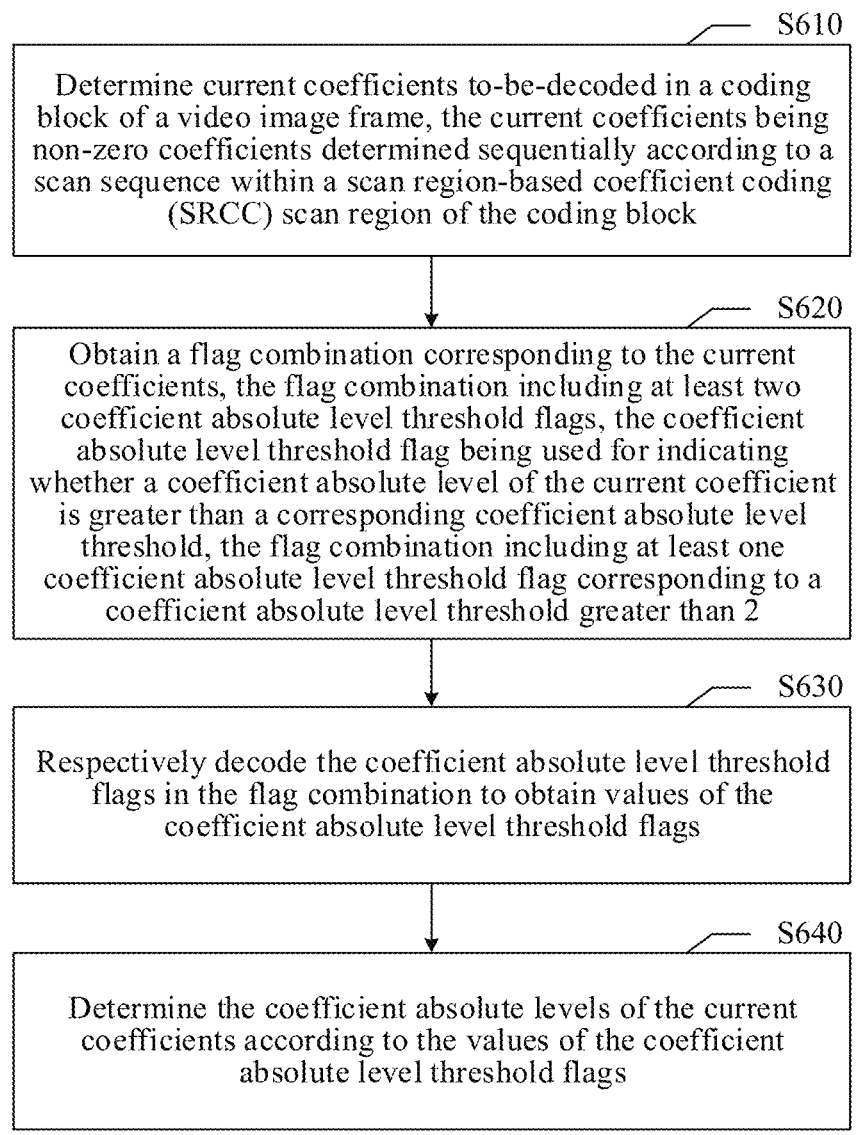
FIG. 6 is a schematic flowchart of steps of a video decoding method according to certain embodiment(s) of the present disclosure.

FIG. 6 is a flowchart of steps of a video decoding method according to an embodiment of the present disclosure. The video decoding method may be performed by a device having a computing processing function, for example, may be performed by a terminal device or a server. Referring to FIG. 6, the video decoding method includes step S610 to step S640 below.

Step S610: Determine current coefficients to-be-decoded in a coding block of a video image frame, the current coefficients being non-zero coefficients determined sequentially according to a scan sequence within a scan region-based coefficient coding (SRCC) scan region of the coding block.

In an embodiment of the present disclosure, a video image frame sequence includes a series of images. Each image may be further partitioned into slices, and the slices may be further partitioned into a series of LCUs (or CTUs), each LCU including a plurality of CUs. The video image frame is coded by block during coding. In some new video coding standards, for example, in the H.264 standard, a macroblock (MB) is provided. The MB may be further partitioned into a plurality of prediction blocks that may be used for predictive coding. In the HEVC standard, concepts such as a CU, a prediction unit (PU), and a transform unit (TU) are used, various block units are partitioned by function, and a new tree-based structure is used for description. For example, a CU may be partitioned into smaller CUs according to a quadtree, and the smaller CUs may be further partitioned to form a quadtree structure. The coding block in this embodiment of the present disclosure may be a CU, or a block smaller than the CU, such as a smaller block obtained by partitioning the CU.

Step S620: Obtain a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2.

In an embodiment of the present disclosure, the flag combination may include n coefficient absolute level threshold flags corresponding to n consecutively increasing coefficient absolute level thresholds starting from one, n being an integer greater than or equal to three. For example, the n consecutively increasing coefficient absolute level thresholds x starting from one are sequentially 1, 2, 3, 4, 5, . . . , n, where n>=3. The corresponding flag combination includes n coefficient absolute level threshold flags coeff_abs_level_greaterx_flag.

In an embodiment of the present disclosure, the flag combination includes n coefficient absolute level threshold flags corresponding to n non-consecutively increasing or partially consecutively increasing coefficient absolute level thresholds, n being an integer greater than or equal to two. For example, the n non-consecutively increasing or partially consecutively increasing coefficient absolute level thresholds x are sequentially $x(1), x(2), \ldots, x(k), \ldots, x(n)$, where n>=2, k=1, 2, . . . , n, and $1<=x(1)<x(2)< \ldots <x(n)$. The corresponding flag combination includes n coefficient absolute level threshold flags coeff_abs_level_greaterx(k)_flag.

The flag combination in the embodiments of the present disclosure may include, but is not limited to, any of the following combinations.

(1) The coefficient absolute level thresholds x are 2 and 4, and the corresponding flag combination is: coeff_abs_level_greater2_flag, coeff_abs_level_greater4_flag.

(2) The coefficient absolute level thresholds x are 2 and 6, and the corresponding flag combination is: coeff_abs_level_greater2_flag, coeff_abs_level_greater6_flag.

(3) The coefficient absolute level thresholds x are 2, 4, and 6, and the corresponding flag combination is: coeff_abs_level_ greater2_flag, coeff_abs_level_greater4_flag, coeff_abs_level_greater6_flag.

(4) The coefficient absolute level thresholds x are 2, 4, and 8, and the corresponding flag combination is: coeff_abs_level_ greater2_flag, coeff_abs_level_greater4_flag, coeff_abs_level_greater8_flag.

(5) The coefficient absolute level thresholds x are 2, 6, and 8, and the corresponding flag combination is: coeff_abs_level_ greater2_flag, coeff_abs_level_greater6_flag, coeff_abs_level_greater8_flag.

(6) The coefficient absolute level thresholds x are 2, 6, and 10, and the corresponding flag combination is: coeff_abs_level_ greater2_flag, coeff_abs_level_greater6_flag, coeff_abs_level_greater10_flag.

(7) The coefficient absolute level thresholds x are 1, 2, 4, and 6, and the corresponding flag combination is: coeff_abs_level_greater1_flag, coeff_abs_level_greater2_flag, coeff_abs_ level_greater4_flag, coeff_abs_level_greater6_flag.

(8) The coefficient absolute level thresholds x are 1, 2, 4, and 8, and the corresponding flag combination is: coeff_abs_level_ greater1_flag, coeff_abs_level_greater2_flag, coeff_abs_level_ greater4_flag, coeff_abs_level_greater8_flag.

(9) The coefficient absolute level thresholds x are 2, 3, 5, and 9, and the corresponding flag combination is: coeff_abs_level_ greater2_flag, coeff_abs_level_greater3_flag, coeff_abs_level_greater5_flag, coeff_abs_level_greater9_flag.

Step S630: Respectively decode the coefficient absolute level threshold flags in the flag combination to obtain values of the coefficient absolute level threshold flags.

In an embodiment of the present disclosure, a method of respectively decoding the coefficient absolute level threshold flags in the flag combination may include: respectively determining decoding modes corresponding to the coefficient absolute level threshold flags, the decoding mode including at least one of bypass decoding or regular decoding;

in response to determining that the decoding method corresponding to the coefficient absolute level threshold flag is bypass decoding, inputting the coefficient absolute level threshold flag to a bypass decoding engine to decode the coefficient absolute level threshold flag through the bypass decoding engine; and in response to determining that the decoding method corresponding to the coefficient absolute level threshold flag is regular decoding, inputting the coefficient absolute level threshold flag to a regular decoding engine based on a context model to decode the coefficient absolute level threshold flag through the regular decoding engine.

In an embodiment of the present disclosure, the same decoding method or different decoding methods may be selected for the coefficient absolute level threshold flags corresponding to different coefficient absolute level thresholds.

Step S640: Determine the coefficient absolute levels of the current coefficients according to the values of the coefficient absolute level threshold flags.

The value or value range of the coefficient absolute level of the current coefficient may be determined according to a value result of one coefficient absolute level threshold flag. The value results of multiple coefficient absolute level threshold flags in the flag combination may be combined to gradually reduce the value range of the coefficient absolute level and finally determine the coefficient absolute level of the current coefficient.

In an embodiment of the present disclosure, the coefficient absolute level threshold flag may be decoded by bypass decoding or regular decoding. The regular decoding desires assigning a suitable probability model for each inputted binary bit according to a value of a previously decoded syntax element or binary bit, that is, assigning a context model for the coefficient absolute level threshold flag to be decoded.

Figure 7:
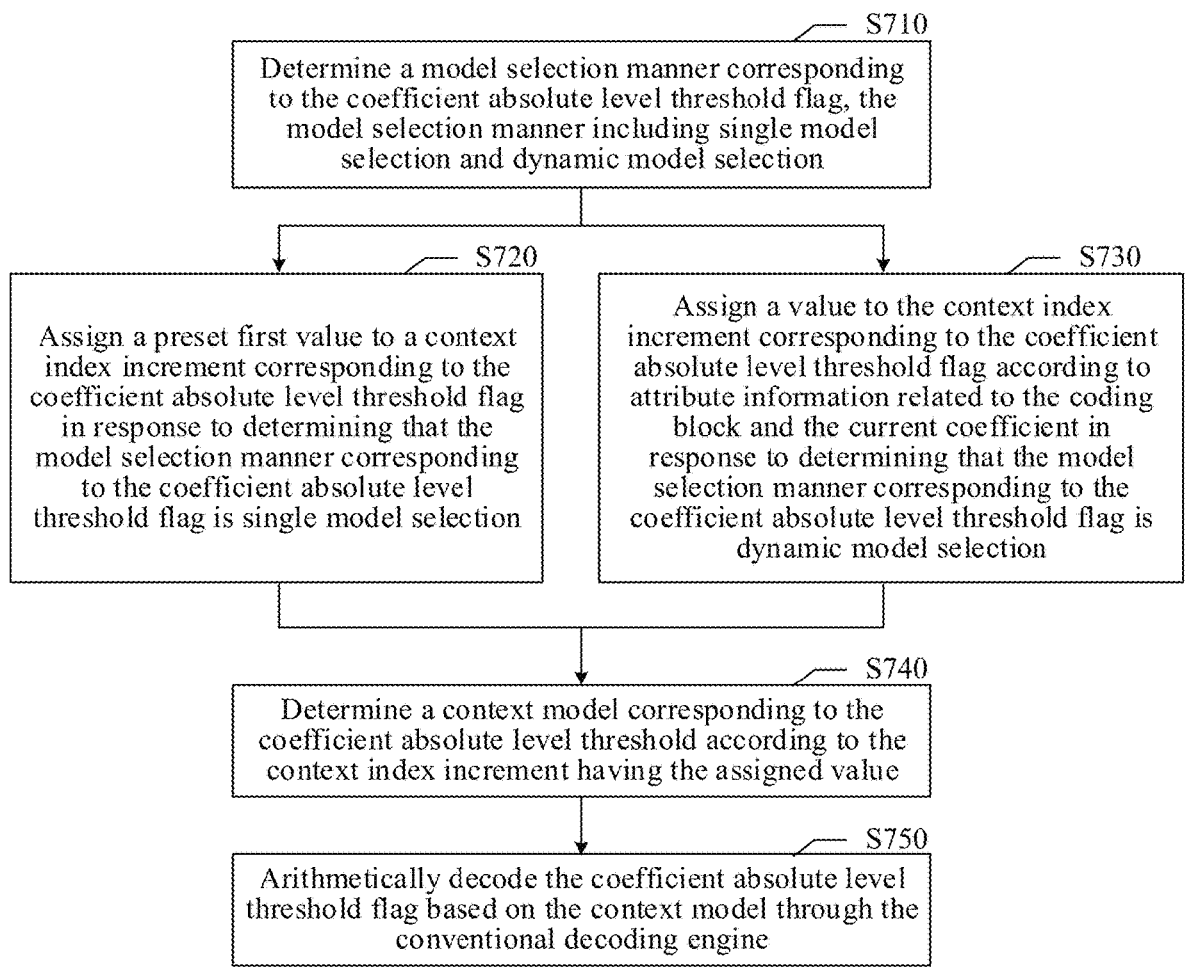
FIG. 7 is a schematic flowchart of steps of decoding a coefficient absolute level threshold flag according to certain embodiment(s) of the present disclosure.

FIG. 7 is a flowchart of steps of decoding a coefficient absolute level threshold flag by regular decoding according to an embodiment of the present disclosure. As shown in FIG. 7, on the basis of the above embodiments, a method of decoding the coefficient absolute level threshold flag through the regular decoding engine may include the following steps S710 to S750.

Step S710: Determine a model selection manner corresponding to the coefficient absolute level threshold flag, the model selection manner including single model selection and dynamic model selection.

Step S720: Assign a preset first value to a context index increment corresponding to the coefficient absolute level threshold flag in response to determining that the model selection manner corresponding to the coefficient absolute level threshold flag is single model selection.

Step S730: Assign a value to the context index increment corresponding to the coefficient absolute level threshold flag according to attribute information related to the coding block and the current coefficient in response to determining that the model selection manner corresponding to the coefficient absolute level threshold flag is dynamic model selection.

Step S740: Determine a context model corresponding to the coefficient absolute level threshold according to the context index increment having the assigned value.

Step S750: Arithmetically decode the coefficient absolute level threshold flag based on the context model through the regular decoding engine.

For the single model selection manner, the preset first value is used as the context index increment, and it may be determined that each non-zero coefficient within the scan region corresponds to one same context index increment, i.e., the coefficient absolute level threshold flags for all non-zero coefficients are arithmetically decoded using one same context model. For the dynamic model selection manner, the non-zero coefficients at different positions may have different context index increments, and depending on the different context index increments, the coefficient absolute level thresholds of the non-zero coefficients may be algorithmically decoded using different context models. For example, the first value is 0 (by way example only). When it is determined that the model selection manner is single model selection, the context index increment may be set to ctxIdxInc=0, that is, with no increment being added, the corresponding context model is directly located using the context index start ctxIdxStart. When it is determined that the model selection manner is dynamic model selection, the context index increments ctxIdxInc with different values may be determined according to relevant attributes of the coding block, the scan region, and the non-zero coefficients. By adding different context index increments ctxIdxInc to the context start index ctxIdxStart, different context models may be located.

Figure 8:
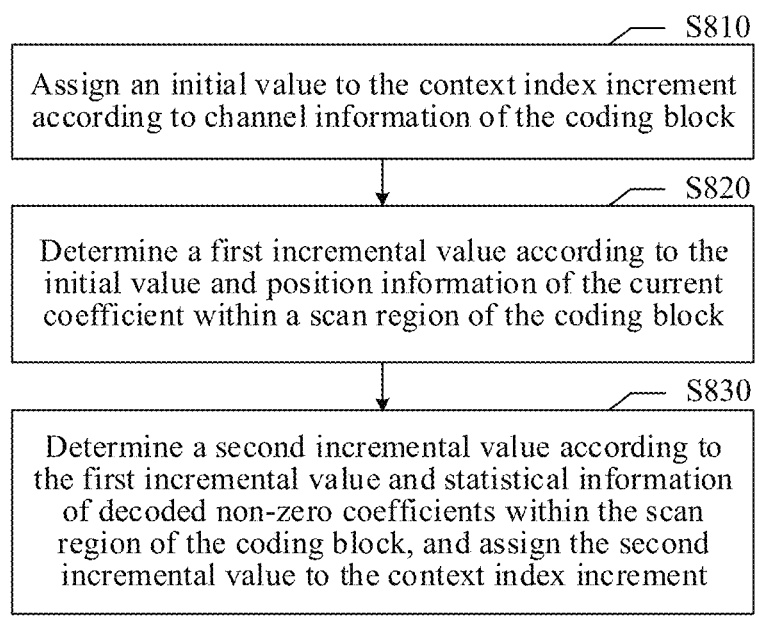
FIG. 8 is a schematic flowchart of steps of assigning a value to a context index increment according to certain embodiment(s) of the present disclosure.

FIG. 8 is a flowchart of steps of assigning a value to a context index increment based on a dynamic model selection manner according to an embodiment of the present disclosure. Based on the above embodiments, the assigning a value to the context index increment corresponding to the coefficient absolute level threshold flag according to attribute information related to the coding block and the current coefficient in step S730 may include the following steps S810 to S830.

Step S810: Assign an initial value to the context index increment according to channel information of the coding block.

In an embodiment of the present disclosure, a preset second value is assigned to the initial value of the context index increment in response to the coding block being a luma block; and a sum of the second value and a third value is assigned to the initial value of the context index increment in response to the coding block being a chroma block. For example, the second value is 0 and the third value is 17. If the coding block is a luma block, the initial value of the context index increment is assigned 0, i.e., ctxIdxInc=0. If the coding block is a chroma block, the initial value of the context index increment is assigned 0+17=17, i.e., ctxIdxInc+=17.

Step S820: Determine a first incremental value according to the initial value and position information of the current coefficient within a scan region of the coding block.

In an embodiment of the present disclosure, the initial value is determined as the first incremental value in response to the current coefficient being a first coefficient or a last coefficient scanned in the scan region of the coding block according to the scan sequence; and the initial value is increased according to a relative position of the current coefficient in the scan region of the coding block to obtain the first incremental value in response to the current coefficient being a coefficient other than the first coefficient and the last coefficient in the scan region of the coding block. For example, the SRCC scan region is a rectangular region determined by the position (0, 0) of the coefficient in the upper left corner and the position (sr_x, sr_y) of the coefficient in the lower right corner, and the position of the current coefficient in the coding block is (pos_x, pos_y). Taking the reverse Z-shaped scanning order as an example, if pos_x=sr_x and pos_y=sr_y, it indicates that the current coefficient is the first coefficient scanned according to the scanning order. If pos_x=0 and pos_y=0, it indicates that the current coefficient is the last coefficient scanned according to the scanning order. The initial value determined in step S810 is directly used as the first incremental value. On the contrary, if the current coefficient is a coefficient other than the first coefficient and the last coefficient in the scan region, the initial value is increased to different degrees according to a relative position of the current coefficient in the scan region to obtain the first incremental value.

In an embodiment of the present disclosure, a method of determining the first incremental value based on the relative position of the current coefficient may include: dividing the scan region into multiple different local regions in an order from top left to bottom right, and increasing the initial value to obtain the first incremental value according to the local region where the current coefficient is located.

In an embodiment of the present disclosure, different scan region partitioning methods may be selected for coding blocks that use different predictive coding modes. In an embodiment of the present disclosure, first, it may be determined whether a predictive coding mode of the coding block is an ordinary intra prediction mode; in response to the predictive encoding mode being the ordinary intra prediction mode, the scan region is divided into a first region number of local regions in an order from top left to bottom right, and the initial value is increased according to the local region where the current coefficient is located to obtain the first incremental value; and In response to the predictive encoding mode being not the ordinary intra prediction mode (such as an inter prediction mode or other coding prediction mode), the scan region is divided into a second region number of local regions in an order from top left to bottom right, and the initial value is increased according to the local region where the current coefficient is located to obtain the first incremental value.

In an embodiment of the present disclosure, the first number of regions is 3, and when the predictive coding mode of the coding block is the ordinary intra prediction mode, the scan region may be divided into three local regions in the order from top left to bottom right.

Figure 9:
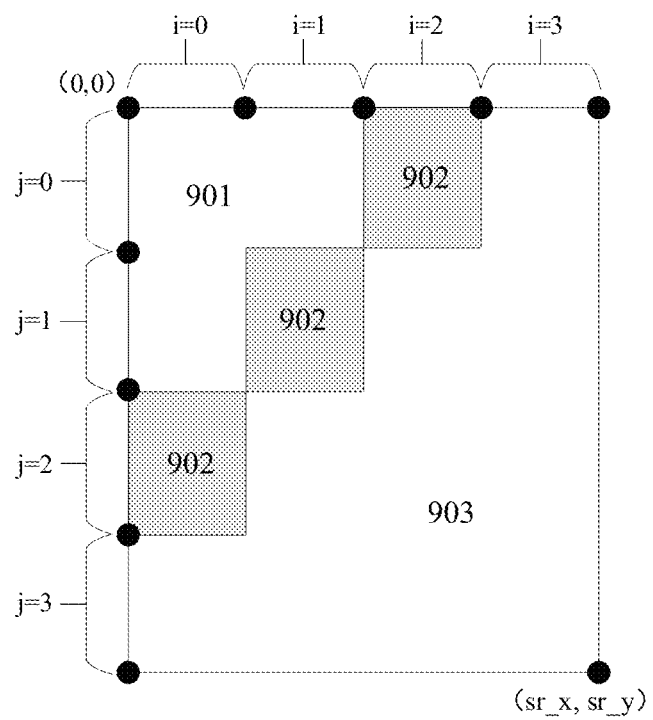
FIG. 9 is a schematic diagram of a region distribution of scan regions according to certain embodiment(s) of the present disclosure.

FIG. 9 is a schematic diagram of a region distribution of scan regions divided from a coding block using an ordinary intra prediction mode according to an embodiment of the present disclosure. As shown in FIG. 9, the SRCC scan region in the embodiments of the present disclosure is a rectangular region determined by the position (0, 0) of the coefficient in the upper left corner and the position (sr_x, sr_y) of the coefficient in the lower right corner, and the position of the current coefficient in the coding block is (pos_x, pos_y). A first mapping value i is determined according to a relationship between pos_x and a fraction of sr_x, and a second mapping value j is determined according to a relationship between pos_y and a fraction of sr_y.

$i=(pos\_x<=sr\_x/2)?(pos\_x<=sr\_x/4?0:1)?(pos\_x<=sr\_x*3/4?2:3)$ $j=(pos\_y<=sr\_y/2)? \ (pos\_y<=sr\_y/4?0:1)?(pos\_y<=sr\_y*3/4?2:3)$ When pos_x<=sr_x/4, i=0; when sr_x/4<pos_x<=sr_x/2, i=1; when sr_x/2<pos_x<=sr_x*3/4, i=2; when sr_x*3/4<pos_x, i=3.

When pos_y<=sr_y/4, j=0; when sr_y/4<pos_y<=sr_y/2, j=1; when sr_y/2<pos_y<=sr_y*3/4, j=2; when sr_y*3/4<pos_y, j=3.

A sum of the first mapping value i and the second mapping value j is calculated to obtain a third mapping value s, where s=i+j.

The scan region is divided into three local regions in the order from top left to bottom right, namely, a first local region 901, a second local region 902, and a third local region 903. For the current coefficients that fall within different regions, the initial value may be increased by different magnitudes to the first incremental value.

For example, if s<=1, the current coefficient falls in the first local region 901, and the initial value may be increased by 4 to obtain the first incremental value, that is, ctxIdxInc+=4. If s>2, the current coefficient falls in the third local region 903, and the initial value may be increased by 8 to obtain the first incremental value, that is, ctxIdxInc+=8. If 1<s<=2, the current coefficient falls in the second local region 902, and the initial value may be increased by 12 to obtain the first incremental value, that is, ctxIdxInc+=12.

In an embodiment of the present disclosure, the second number of regions is 2, and when the predictive coding mode of the coding block is not the ordinary intra prediction mode, the scan region may be divided into two local regions in the order from top left to bottom right.

Figure 10:
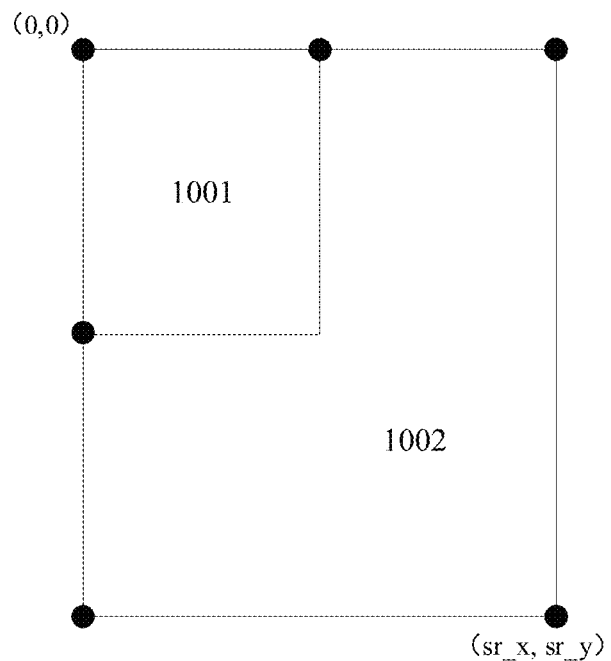
FIG. 10 is a schematic diagram of a region distribution of scan regions according to certain embodiment(s) of the present disclosure.

FIG. 10 is a schematic diagram of a region distribution of scan regions divided from a coding block not using an ordinary intra prediction mode according to an embodiment of the present disclosure. As shown in FIG. 10, the SRCC scan region in the embodiments of the present disclosure is a rectangular region determined by the position (0, 0) of the coefficient in the upper left corner and the position (sr_x, sr_y) of the coefficient in the lower right corner, and the position of the current coefficient in the coding block is (pos_x, pos_y).

The scan region is divided into two local regions in the order from top left to bottom right, namely, a fourth local region 1001 and a fifth local region 1002. For the current coefficients that fall within different regions, the initial value may be increased by different magnitudes to the first incremental value.

For example, if pos_x<=sr_x/2 and pos_y<=sr_y/2, the current coefficient falls in the fourth local region 1001, and the initial value may be increased by 4 to obtain the first incremental value, that is, ctxIdxInc+=4. If pos_x>sr_x/2 or pos_y>sr_y/2, the current coefficient falls in the fifth local region 1002, and the initial value may be increased by 8 to obtain the first incremental value, that is, ctxIdxInc+=8.

Step S830: Determine a second incremental value according to the first incremental value and statistical information of decoded non-zero coefficients within the scan region of the coding block, and assign the second incremental value to the context index increment.

In an embodiment of the present disclosure, a statistical number of coefficients each corresponding to a coefficient absolute level greater than the coefficient absolute level threshold among first m non-zero coefficients that have been decoded in the scan region is calculated, m being a preset integer; and the first incremental value is increased according to the statistical number to obtain the second incremental value. If the number of non-zero coefficients having been decoded is less than m, the statistical number of coefficients is determined among all the decoded non-zero coefficients.

In an embodiment of the present disclosure, m has a value of 5, and a statistical number num_gtx of coefficients each corresponding to a coefficient absolute level greater than the coefficient absolute level threshold among first five non-zero coefficients that have been decoded in the scan region may be calculated. In an embodiment of the present disclosure, if the number of non-zero coefficients each corresponding to a coefficient absolute level greater than the coefficient absolute level threshold is less than or equal to three, the number of corresponding non-zero coefficients is determined as the statistical number num_gtx. If the number of non-zero coefficients each corresponding to a coefficient absolute level greater than the coefficient absolute level threshold is greater than three, the statistical number num_gtx is assigned 3, i.e., num_gtx=3.

After the statistical number num_gtx is obtained, the first incremental value may be increased based on the statistical number num_gtx to obtain the second incremental value, that is, ctxIdxInc+=num_gtx+1.

Thus, the second incremental value is assigned to the context index increment, the corresponding context model may be located according to the assigned context index increment, and the corresponding coefficient absolute level threshold flag is decoded based on the context model to obtain the value of the coefficient absolute level threshold flag.

After the decoding of the coefficient absolute level thresholds in the flag combination is performed, the coefficient absolute level of the current coefficient may be determined according to the corresponding combination relationship for different flag combination forms.

In an embodiment of the present disclosure, the flag combination may include n coefficient absolute level threshold flags corresponding to n consecutively increasing coefficient absolute level thresholds (or in certain embodiment(s), starting from one), n being an integer greater than or equal to three. For example, n has a value of 5, and the coefficient absolute level thresholds x are sequentially 1, 2, 3, 4, 5. The flag combination correspondingly includes five coefficient absolute level threshold flags:

coeff_abs_level_greater1_flag;
coeff_abs_level_greater2_flag;
coeff_abs_level_greater3_flag;
coeff_abs_level_greater4_flag; and
coeff_abs_level_greater5_flag.

Figure 11:
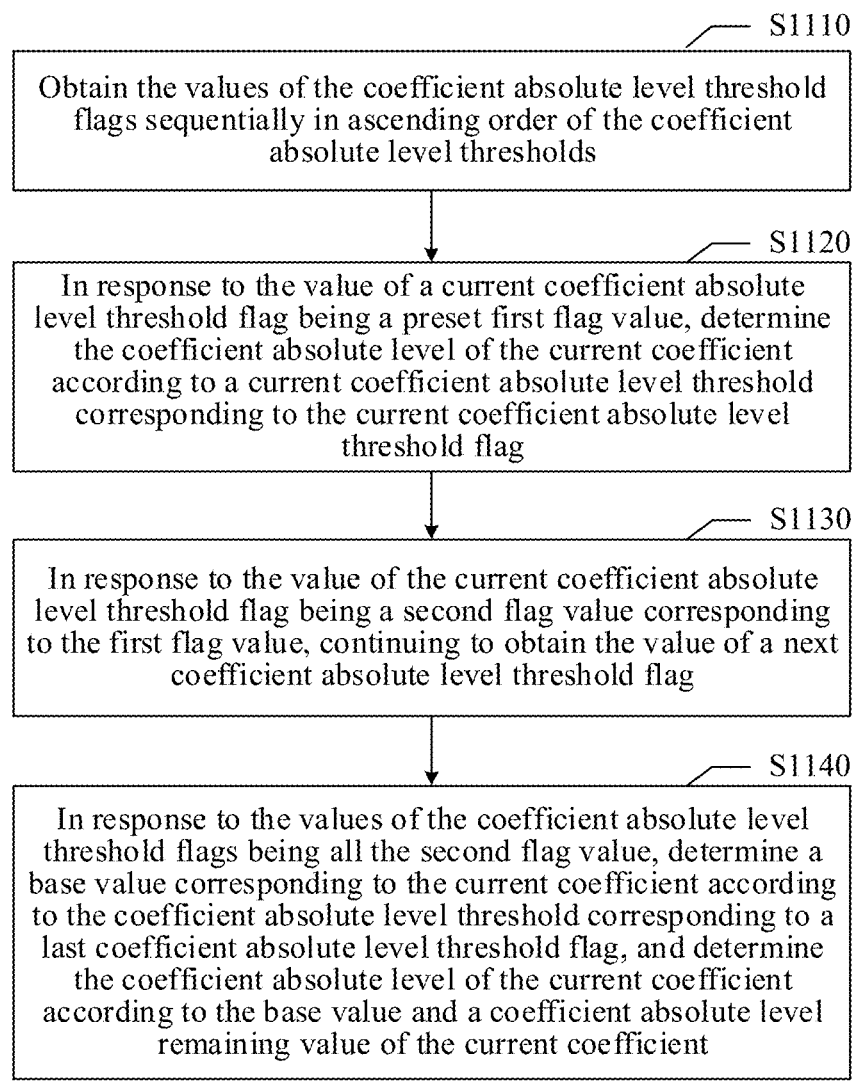
FIG. 11 is a schematic flowchart of steps of determining a coefficient absolute level according to certain embodiment(s) of the present disclosure.

FIG. 11 is a flowchart of steps of determining a coefficient absolute level based on a consecutively increasing flag combination (or in certain embodiment(s), starting from one) according to an embodiment of the present disclosure. As shown in FIG. 11, based on the above embodiments, the determining the coefficient absolute levels of the current coefficients according to the values of the coefficient absolute level threshold flags in step S640 may include the following steps S1110 to S1140.

Step S1110: Obtain the values of the coefficient absolute level threshold flags sequentially in ascending order of the coefficient absolute level thresholds.

The value of the coefficient absolute level threshold flag obtained by decoding is a first flag value or a second flag value. The first flag value may be, for example, 0, and the second flag value may be, for example, 1.

Step S1120: In response to the value of a current coefficient absolute level threshold flag being a preset first flag value, determine the coefficient absolute level of the current coefficient according to a current coefficient absolute level threshold corresponding to the current coefficient absolute level threshold flag.

For example, if the value of the current coefficient absolute level threshold flag coeff_abs_level_greaterx_flag is 0, the current coefficient absolute level threshold x may be determined as the value of the coefficient absolute level coeff_abs_level of the current coefficient, that is, coeff_abs_level=x.

Step S1130: In response to the value of the current coefficient absolute level threshold flag being a second flag value corresponding to the first flag value, continuing to obtain the value of a next coefficient absolute level threshold flag.

For example, if the value of the current coefficient absolute level threshold flag coeff_abs_level_greaterx_flag is 1, it may be determined that the value range of the coefficient absolute level coeff_abs_level of the current coefficient is greater than the corresponding coefficient absolute level threshold x. The value of the next coefficient absolute level threshold flag may further be obtained, and the value or value range of the coefficient absolute level coeff_abs_level of the current coefficient may further be determined according to the value of the next coefficient absolute level threshold flag.

Step S1140: In response to the values of the coefficient absolute level threshold flags being all the second flag value, determine a base value corresponding to the current coefficient according to the coefficient absolute level threshold corresponding to a last coefficient absolute level threshold flag, and determine the coefficient absolute level of the current coefficient according to the base value and a coefficient absolute level remaining value of the current coefficient.

For example, when the values of all the coefficient absolute level threshold flags in the flag combination are 1, it indicates that the value range of the coefficient absolute level of the current coefficient is greater than the coefficient absolute level threshold n corresponding to the last coefficient absolute level threshold flag coeff_abs_level_greatern_flag. A base value base_level corresponding to the current coefficient may be determined according to the coefficient absolute level threshold n, that is, base_level=n+1. The value of the coefficient absolute level coeff_abs_level of the current coefficient is further determined based on the base value and the coefficient absolute level remaining value coeff_abs_level_remaining of the current coefficient.

In an embodiment of the present disclosure, a method of determining the coefficient absolute level of the current coefficient according to the base value and a coefficient absolute level remaining value of the current coefficient may include: performing entropy decoding and reverse binarization processing on the coefficient absolute level remaining value of the current coefficient to obtain a value of the coefficient absolute level remaining value; and adding the value of the coefficient absolute level remaining value and the base value to obtain the coefficient absolute level of the current coefficient.

In an embodiment of the present disclosure, a method of performing entropy decoding and reverse binarization processing on the coefficient absolute level remaining value of the current coefficient may include: performing the entropy decoding and reverse binarization processing on the coefficient absolute level remaining value of the current coefficient according to a k-order exponential Golomb code.

In an embodiment of the present disclosure, the coefficient absolute level thresholds corresponding to the flag combination are sequentially x=1, 2, 3, . . . , n (n>=3).

The method logic for determining the value or value range of the coefficient absolute level of the current coefficient based on the values of the coefficient absolute level threshold flags in the flag combination is as follows.

(1) Let x=1.

(2) Obtain the value obtained after decoding the coefficient absolute level threshold flag coeff_abs_level_greaterx_flag. If the value of coeff_abs_level_greaterx_flag is 0, let coeff_abs_level=x, and the decoding of the non-zero coefficient absolute level coeff_abs_level is performed.

(3) If the value of coeff_abs_level_greaterx_flag is 1, a value range coeff_abs_level>=x+1 may be determined. Assuming that x<n, let x=x+1, and continue to perform step 2.

(4) If x=n, a value range coeff_abs_level>=n+1 may be determined, and let the base value base_level=n+1.

After the value range and the base value of the coefficient absolute level of the current coefficient are determined, the coefficient absolute level remaining value coeff_abs_level_remaining of the current coefficient may be logically decoded according to the following method, and the final non-zero coefficient absolute level coeff_abs_level is derived.

(1) When the value of coeff_abs_level_greatern_flag is 1, a value range coeff_abs_level>=n+1 and a base value base_level=n+1 may be determined. Entropy decoding and inverse binarization may be performed on the coeff_abs_level_remaining according to k-order exponential Golomb code, and the value of coeff_abs_level_remaining may be derived. A k-order exponential Golomb code table is shown in Table 3 below.

(2) Let coeff_abs_level=base_level+coeff_abs_level_remaining, and the decoding of the non-zero coefficient absolute level coeff_abs_level is performed.

TABLE 3

| | K-order exponential Golomb code table | |
|---|---|---|
| Order | Code word structure | CodeNum value range |
| k = 0 | 1 | 0 |
| | 0 1 $x_0$ | 1-2 |
| | 0 0 1 $x_1$ $x_0$ | 3-6 |
| | 0 0 0 1 $x_2$ $x_1$ $x_0$ | 7-14 |
| | . . . | . . . |
| k = 1 | 1 x0 | 0-1 |
| | 0 1 $x_1$ $x_0$ | 2-5 |
| | 0 0 1 $x_2$ $x_1$ $x_0$ | 6-13 |
| | 0 0 0 1 $x_3$ $x_2$ $x_1$ $x_0$ | 14-29 |
| | . . . | . . . |

TABLE 3-continued

K-order exponential Golomb code table

| Order | Code word structure | CodeNum value range |
|---|---|---|
| k =2 | 1 $x_1$ $x_0$ | 0-3 |
| | 0 1 $x_2$ $x_1$ $x_0$ | 4-11 |
| | 0 0 1 $x_3$ $x_2$ $x_1$ $x_0$ | 12-27 |
| | 0 0 0 1 $x_4$ $x_3$ $x_2$ $x_1$ $x_0$ | 28-59 |
| | ... | ... |
| k = 3 | 1 $x_2$ $x_1$ $x_0$ | 0-7 |
| | 0 1 $x_3$ $x_2$ $x_1$ $x_0$ | 8-23 |
| | 0 0 1 $x_4$ $x_3$ $x_2$ $x_1$ $x_0$ | 24-55 |
| | 0 0 0 1 $x_5$ $x_4$ $x_3$ $x_2$ $x_1$ $x_0$ | 56-119 |
| | ... | ... |

In an implementation scenario of the present disclosure, the coefficient absolute level thresholds corresponding to the flag combination are sequentially x=1, 2, 3, 4, 5. A method of decoding the coefficient absolute level includes the following steps.

(1) Decode the first coefficient absolute level threshold coeff_abs_level_greater1_flag. If the value of the coeff_abs_level_greater1_flag obtained by decoding is 0, coeff_abs_level=1, and the decoding of the non-zero coefficient absolute level coeff_abs_level is performed.

(2) If the value of coeff_abs_level_greater1_flag is 1, continue to decode coeff_abs_level_greater2_flag. If the value of coeff_abs_level_greater2_flag obtained by decoding is 0, coeff_abs_level=2, and the decoding of the non-zero coefficient absolute level coeff_abs_level is performed.

(3) If the value of coeff_abs_level_greater2_flag is 1, continue to decode coeff_abs_level_greater3_flag. If the value of coeff_abs_level_greater3_flag obtained by decoding is 0, coeff_abs_level=3, and the decoding of the non-zero coefficient absolute level coeff_abs_level is performed.

(4) If the value of coeff_abs_level_greater3_flag is 1, continue to decode coeff_abs_level_greater4_flag. If the value of coeff_abs_level_greater4_flag obtained by decoding is 0, coeff_abs_level=4, and the decoding of the non-zero coefficient absolute level coeff_abs_level is performed.

(5) If the value of coeff_abs_level_greater4_flag is 1, continue to decode coeff_abs_level_greater5_flag. If the value of coeff_abs_level_greater5_flag obtained by decoding is 0, coeff_abs_level=5, and the decoding of the non-zero coefficient absolute level coeff_abs_level is performed.

(6) If the value of coeff_abs_level_greater5_flag is 1, a value range coeff_abs_level>=6 may be determined. Let the base value base_level=6, continue to decode the coefficient absolute level remaining value coeff_abs_level_remaining.

Based on the above steps, it may be determined that the value range of the coefficient absolute level is coeff_abs_level>=6 and base_level=6. Entropy decoding and inverse binarization may be performed on the coeff_abs_level_remaining according to k-order exponential Golomb code (see Table 3, for example, using 0-order exponential Golomb code), and the value of coeff_abs_level_remaining may be derived. Let coeff_abs_level=base_level+coeff_abs_level_remaining, and the decoding of the non-zero coefficient absolute level coeff_abs_level is performed.

In an embodiment of the present disclosure, the flag combination includes n coefficient absolute level threshold flags corresponding to n non-consecutively increasing or partially consecutively increasing coefficient absolute level thresholds, n being an integer greater than or equal to two. For example, the n non-consecutively increasing or partially consecutively increasing coefficient absolute level thresholds x are sequentially x(1), x(2), ..., x(k), ..., x(n), where n>=2, k=1, 2, ..., n, and 1<=x(1)<x(2)< ... <x(n). The corresponding flag combination includes n coefficient absolute level threshold flags coeff_abs_level_greaterx(k)_flag.

For example, n has a value of 4, and the coefficient absolute level thresholds x are sequentially 1, 2, 4, 8. The flag combination correspondingly includes four coefficient absolute level threshold flags:

coeff_abs_level_greater1_flag;
coeff_abs_level_greater2_flag;
coeff_abs_level_greater4_flag; and
coeff_abs_level_greater8_flag.

Figure 12:
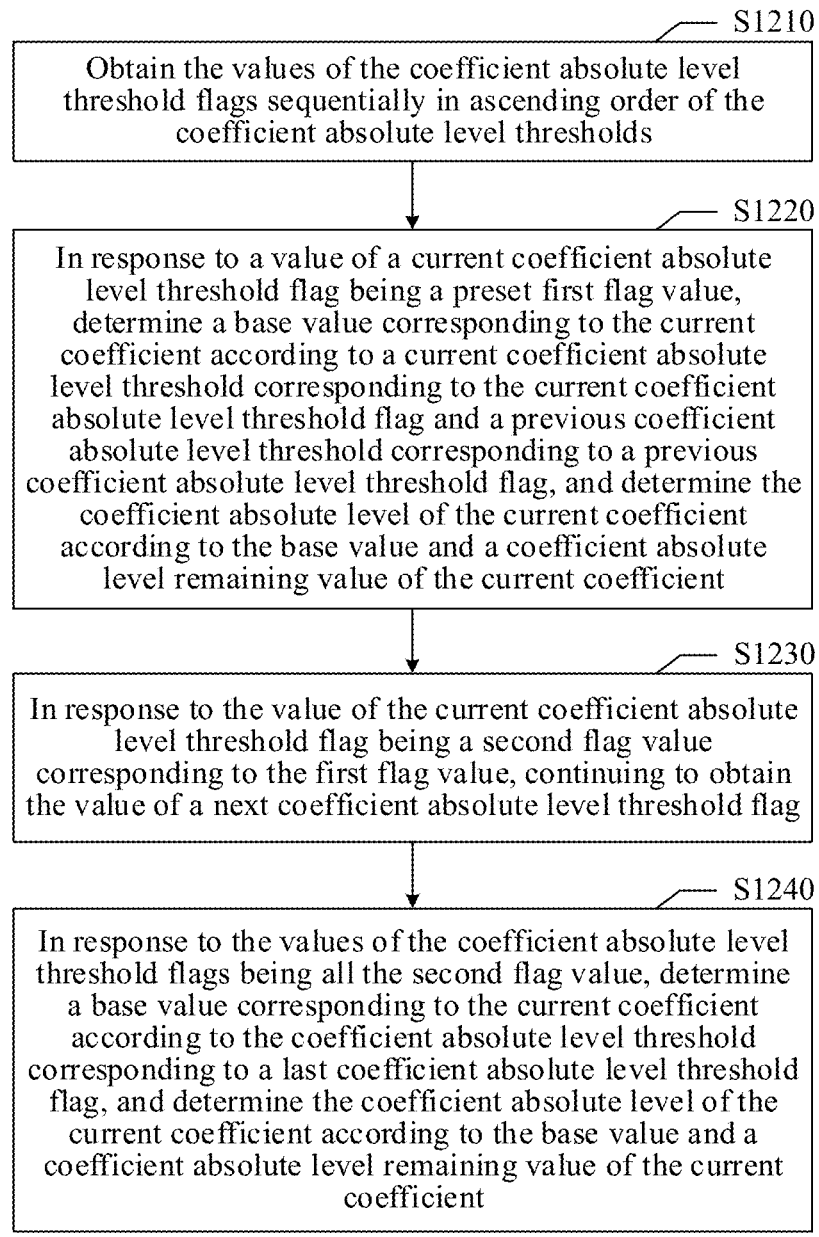
FIG. 12 is a schematic flowchart of steps of determining a coefficient absolute level according to certain embodiment(s) of the present disclosure.

FIG. 12 is a flowchart of steps of determining a coefficient absolute level based on non-consecutively increasing or partially consecutively increasing flag combination according to an embodiment of the present disclosure. As shown in FIG. 12, based on the above embodiments, the determining the coefficient absolute levels of the current coefficients according to the values of the coefficient absolute level threshold flags in step S640 may include the following steps S1210 to S1240.

Step S1210: Obtain the values of the coefficient absolute level threshold flags sequentially in ascending order of the coefficient absolute level thresholds.

The value of the coefficient absolute level threshold flag obtained by decoding is a first flag value or a second flag value. The first flag value may be, for example, 0, and the second flag value may be, for example, 1.

Step S1220: In response to a value of a current coefficient absolute level threshold flag being a preset first flag value, determine a base value corresponding to the current coefficient according to a current coefficient absolute level threshold corresponding to the current coefficient absolute level threshold flag and a previous coefficient absolute level threshold corresponding to a previous coefficient absolute level threshold flag, and determine the coefficient absolute level of the current coefficient according to the base value and a coefficient absolute level remaining value of the current coefficient.

For example, if the value of the current coefficient absolute level threshold flag coeff_abs_level_greaterx(k)_flag is 0, the value range of the coefficient absolute level coeff_abs_level of the current coefficient may be determined according to the current coefficient absolute level threshold x(k) and a previous coefficient absolute level threshold x(k−1), that is, x(k−1)+1<=coeff_abs_level<=x(k) (when k>1) or 1<=coeff_abs_level<=x(k) (when k=1). If x(k−1)+1=x(k) (when k>1) or x(k)=1 (when k=1), coeff_abs_level=x(k), and the decoding of the non-zero coefficient absolute level coeff_abs_level is performed. Otherwise, let the base value base_level=x(k−1)+1 (k>1) or 1 (k=1).

Step S1230: In response to the value of the current coefficient absolute level threshold flag being a second flag value corresponding to the first flag value, continuing to obtain the value of a next coefficient absolute level threshold flag.

For example, if the value of the current coefficient absolute level threshold flag coeff_abs_level_greaterx(k)_flag is 1, it may be determined that the value range of the coefficient absolute level coeff_abs_level of the current coefficient is greater than the corresponding coefficient absolute level threshold x(k), that is, coeff_abs_level>=x(k)+1. The value of the next coefficient absolute level threshold flag may further be obtained, and the value or value range of the coefficient absolute level coeff_abs_level of the current coefficient may further be determined according to the value of the next coefficient absolute level threshold flag.

Step S1240: In response to the values of the coefficient absolute level threshold flags being all the second flag value, determine a base value corresponding to the current coefficient according to the coefficient absolute level threshold corresponding to a last coefficient absolute level threshold flag, and determine the coefficient absolute level of the current coefficient according to the base value and a coefficient absolute level remaining value of the current coefficient.

For example, when the values of all the coefficient absolute level threshold flags in the flag combination are 1, it indicates that the value range of the coefficient absolute level of the current coefficient is greater than the coefficient absolute level threshold x(n) corresponding to the last coefficient absolute level threshold flag coeff_abs_level_greaterx(n)_flag, that is, coeff_abs_level>=x(n)+1. A base value base_level corresponding to the current coefficient may be determined according to the coefficient absolute level threshold x(n), that is, base_level=x(n)+1. The value of the coefficient absolute level coeff_abs_level of the current coefficient is further determined based on the base value and the coefficient absolute level remaining value coeff_abs_level_remaining of the current coefficient.

In an embodiment of the present disclosure, a method of determining the coefficient absolute level of the current coefficient according to the base value and a coefficient absolute level remaining value of the current coefficient may include: performing entropy decoding and reverse binarization processing on the coefficient absolute level remaining value of the current coefficient to obtain a value of the coefficient absolute level remaining value; and adding the value of the coefficient absolute level remaining value and the base value to obtain the coefficient absolute level of the current coefficient.

In an embodiment of the present disclosure, a method of performing entropy decoding and reverse binarization processing on the coefficient absolute level remaining value of the current coefficient may include: determining a coefficient absolute level value range of the current coefficient according to the values of the coefficient absolute level threshold flags; selecting a target decoding method from a plurality of candidate decoding methods according to a range size of the coefficient absolute level value range; and performing the entropy decoding and reverse binarization processing on the coefficient absolute level remaining value of the current coefficient according to the target decoding method.

In an embodiment of the present disclosure, the plurality of candidate decoding methods that can be selected include at least one of the following decoding methods: a decoding method based on truncated unary code; a decoding method based on unary code; a decoding method based on a fixed-length code of len bits; and a decoding method based on a k-order exponential Golomb code.

Based on the above embodiments, the coefficient absolute level thresholds x corresponding to the flag combination are non-consecutive or partially consecutive x(1), x(2), . . . x(k), . . . , x(n) in sequence, where n>=2, k=1, 2, . . . , n, and 1<=x(1)<x(2)< . . . <x(n).

The method logic for determining the value or value range of the coefficient absolute level of the current coefficient based on the values of the coefficient absolute level threshold flags in the flag combination is as follows.

(1) Let x=x(k), k=1.

(2) Obtain the value obtained after decoding coeff_abs_level_greaterx(k) flag. If the value of coeff_abs_level_greaterx(k)_flag is 0, a value range x(k-1)+1<=coeff_abs_level<=x(k) (when k>1) or 1<=coeff_abs_level<=x(k) (when k=1) may be determined. If x(k-1)+1=x(k) (when k>1) or x(k)=1 (when k=1), it may be determined that coeff_abs_level=x(k), and the decoding of the non-zero coefficient absolute level coeff_abs_level is performed. Otherwise, let the base value base_level=x(k-1)+1 (k>1) or 1 (k=1).

(3) If the value of coeff_abs_level_greater x(k)_flag is 1, a value range coeff_abs_level>=x(k)+1 may be determined. If k<n, let k=k+1, and continue to perform step (2).

(4) If k=n, a value range coeff_abs_level>=x(n)+1 may be determined, and let the base value base_level=x(n)+1.

After the value range and the base value of the coefficient absolute level of the current coefficient are determined, the coefficient absolute level remaining value coeff_abs_level_remaining of the current coefficient may be logically decoded according to the following method, and the final non-zero coefficient absolute level coeff_abs_level is derived.

When k=1 and the value of coeff_abs_level_greater x(1)_flag is 0, a value range 1<=coeff_abs_level<=x(1) may be determined. Let base_level=1, entropy decoding and inverse binarization are performed on the coeff_abs_level_remaining according to one of the following manners, and the value of coeff_abs_level_remaining is derived:

(1) performing inverse binarization based on k-order exponential Golomb code (see Table 3 above);

(2) entropy decoding the bitstream to obtain len=Ceil(log 2(x(1))) bits, and performing inverse binarization based on a fixed length of len bits (see Table 4 below);

(3) performing inverse binarization based on unary code (see Table 5 below);

(4) performing inverse binarization based on truncated unary code (see Table 6 below).

When k=2 to n, the value of coeff_abs_level_greater x(k)_flag is 0, and the value of coeff_abs_level_greater x(k-1)_fla is 1, a value range x(k-1)+1<=coeff_abs_level<=x(k) may be determined. Let the base value base_level=x(k-1)+1, entropy decoding and inverse binarization are performed on the coeff_abs_level_remaining according to one of the following manners, and the value of coeff_abs_level_remaining is derived:

(1) performing inverse binarization based on k-order exponential Golomb code (see Table 3 above);

(2) entropy decoding the bitstream to obtain len=Ceil(log 2(x(k)-x(k-1))) bits, and performing inverse binarization based on a fixed length of len bits (see Table 4 below);

(3) performing inverse binarization based on unary code (see Table 5 below);

(4) performing inverse binarization based on truncated unary code (see Table 6 below).

When k=n and the value of coeff_abs_level_greater x(n)_flag is 1, a value range coeff_abs_level>=n may be determined. Let the base value base_level=n+1. Entropy decoding and inverse binarization are performed on the coeff_abs_level_remaining according to k-order exponential Golomb code (see Table 3), and the value of coeff_abs_level_remaining is derived.

Let coeff_abs_level=base_level+coeff_abs_level_remaining, and the decoding of the non-zero coefficient absolute level coeff_abs_level is performed.

TABLE 4

Relationship between synEl Val and binary symbol strings (fixed-length code with a length of len)

| Value of synEl Val | Binary symbol string | | | | |
|---|---|---|---|---|---|
| 0 | 0 | 0 | ... | 0 | 0 |
| 1 | 0 | 0 | ... | 0 | 1 |
| 2 | 0 | 0 | ... | 1 | 0 |
| 3 | 0 | 0 | ... | 1 | 1 |
| ... | | | ... | | |
| $2^{len}-4$ | 1 | 1 | ... | 0 | 0 |
| $2^{len}-3$ | 1 | 1 | ... | 1 | 0 |
| $2^{len}-2$ | 1 | 1 | ... | 1 | 0 |
| $2^{len}-1$ | 1 | 1 | ... | 1 | 1 |
| binIdx | 0 | 1 | ... | len-2 | len-1 |

Table 5 Relationship Between synElVal and Binary Symbol Strings (Including Two Unary Code Forms: Table 5-1 or Table 5-2)

TABLE 5-1

| synEl Val | Binary symbol string | | | | | |
|---|---|---|---|---|---|---|
| 0 | 1 | | | | | |
| 1 | 0 | 1 | | | | |
| 2 | 0 | 0 | 1 | | | |
| 3 | 0 | 0 | 0 | 1 | | |
| 4 | 0 | 0 | 0 | 0 | 1 | |
| 5 | 0 | 0 | 0 | 0 | 0 | 1 |
| ... | | | | | | |
| binIdx | 0 | 1 | 2 | 3 | 4 | 5 |

TABLE 5-2

| synEl Val | Binary symbol string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Table 6 Relationship Between synElVal and Binary Symbol Strings (Two Forms of Truncated Unary Code: Table 6-1 or Table 6-2)

TABLE 6-1

| synEl Val | Binary symbol string | | | | | | | |
|---|---|---|---|---|---|---|---|---|
| 0 | 1 | | | | | | | |
| 1 | 0 | 1 | | | | | | |
| 2 | 0 | 0 | 1 | | | | | |
| 3 | 0 | 0 | 0 | 1 | | | | |
| 4 | 0 | 0 | 0 | 0 | 1 | | | |
| 5 | 0 | 0 | 0 | 0 | 0 | 1 | | |
| ... | 0 | 0 | 0 | 0 | 0 | 0 | ... | |
| max Val-1 | 0 | 0 | 0 | 0 | 0 | 0 | ... | 1 |
| max Val | 0 | 0 | 0 | 0 | 0 | 0 | ... | 0 |
| binIdx | 0 | 1 | 2 | 3 | 4 | 5 | ... | max Val-1 |

TABLE 6-2

| synEl Val | Binary symbol string | | | | | | | |
|---|---|---|---|---|---|---|---|---|
| 0 | 0 | | | | | | | |
| 1 | 1 | 0 | | | | | | |
| 2 | 1 | 1 | 0 | | | | | |
| 3 | 1 | 1 | 1 | 0 | | | | |
| 4 | 1 | 1 | 1 | 1 | 0 | | | |
| 5 | 1 | 1 | 1 | 1 | 1 | 0 | | |
| ... | 1 | 1 | 1 | 1 | 1 | 1 | ... | |
| max Val-1 | 1 | 1 | 1 | 1 | 1 | 1 | ... | 0 |
| max Val | 1 | 1 | 1 | 1 | 1 | 1 | ... | 1 |
| binIdx | 0 | 1 | 2 | 3 | 4 | 5 | ... | max Val-1 |

In an implementation scenario of the present disclosure, the coefficient absolute level thresholds corresponding to the flag combination are sequentially x=1, 2, 4, 8. A method of decoding the coefficient absolute level includes the following steps.

(1) Decode the first coefficient absolute level threshold coeff_abs_level_greater1_flag. If the value of the coeff_abs_level_greater1_flag obtained by decoding is 0, 1<=coeff_abs_level<=1, so coeff_abs_level=1, and the decoding of the non-zero coefficient absolute level coeff_abs_level is performed.

(2) If the value of coeff_abs_level_greater1_flag is 1, continue to decode coeff_abs_level_greater2_flag. If the value of coeff_abs_level_greater2_flag obtained by decoding is 0, 2<=coeff_abs_level<=2, so coeff_abs_level=2, and the decoding of the non-zero coefficient absolute level coeff_abs_level is performed.

(3) If the value of coeff_abs_level_greater2_flag is 1, continue to decode coeff_abs_level_greater4_flag. If the value of coeff_abs_level_greater4_flag obtained by decoding is 0, 3<=coeff_abs_level<=4, and let the base value base_level=3.

(4) If the value of coeff_abs_level_greater4_flag is 1, continue to decode coeff_abs_level_greater8_flag. If the value of coeff_abs_level_greater8_flag obtained by decoding is 0, 5<=coeff_abs_level<=8, and let the base value base_level=5.

(5) If the value of coeff_abs_level_greater8_flag is 1, a value range coeff_abs_level>=9 may be determined. Let the base value base_level=9, continue to decode the coefficient absolute level remaining value coeff_abs_level_remaining.

Based on the value range and the base value determined in the above steps, the remaining part coeff_abs_level_remaining of the non-zero coefficient absolute level may be decoded, and the final non-zero coefficient absolute level abs_coef[blkpos] may be derived. A decoding method in an embodiment of the present disclosure is as follows.

(1) If the value of coeff_abs_level_greater2_flag is 1 and the value of coeff_abs_level_greater4_flag is 0, 3<=coeff_abs_level<=4. Let base_level=3, the bitstream is entropy decoded to obtain len=1 bits, inverse binarization is performed on coeff_abs_level_remaining based on 1-bit fixed-length code (see Table 2), and the value of coeff_abs_level_remaining is derived.

(2) If the value of coeff_abs_level_greater4_flag is 1 and the value of coeff_abs_level_greater8_flag is 0, 5<=coeff_abs_level<=8. Let base_level=5, the bitstream is entropy decoded to obtain len=2 bits, inverse binarization is performed on coeff_abs_level_remaining based on 2-bit fixed-length code (see Table 2), and the value of coeff_abs_level_remaining is derived.

(3) If the value of coeff_abs_level_greater8_flag is 1, coeff_abs_level>=9. Let base_level=9. Entropy decoding and inverse binarization are performed on the coeff_abs_level_remaining according to k-order exponential Golomb code (see Table 3, for example, using 0-order exponential Golomb code), and the value coeffABsLevelRem of coeff_abs_level_remaining is derived.

(4) Let abs_coef[blkpos]=base_level+coeffABsLevelRem, and the decoding of the non-zero coefficient absolute level coeff_abs_level is performed.

In an example, a method of performing inverse binarization of the remaining value coeff_abs_level_remaining of the non-zero coefficient absolute level is as follows:

If EscapeDataPresent is equal to 1, use 0-order exponential Golomb code to obtain the value of synElVal from the table.

Otherwise, if the value of coeff_abs_level_greater2_flag is 1 and the value of coeff_abs_level_greater4_flag is 0, use a fixed-length code with a length of Len=1 to obtain the value of synElVal from the table.

Otherwise, if the value of coeff_abs_level_greater4_flag is 1 and the value of coeff_abs_level_greater8_flag is 0, use a fixed-length code with a length of Len=2 to obtain the value of synElVal from the table.

synElVal is a value obtained after inverse binarization.

Figure 13:
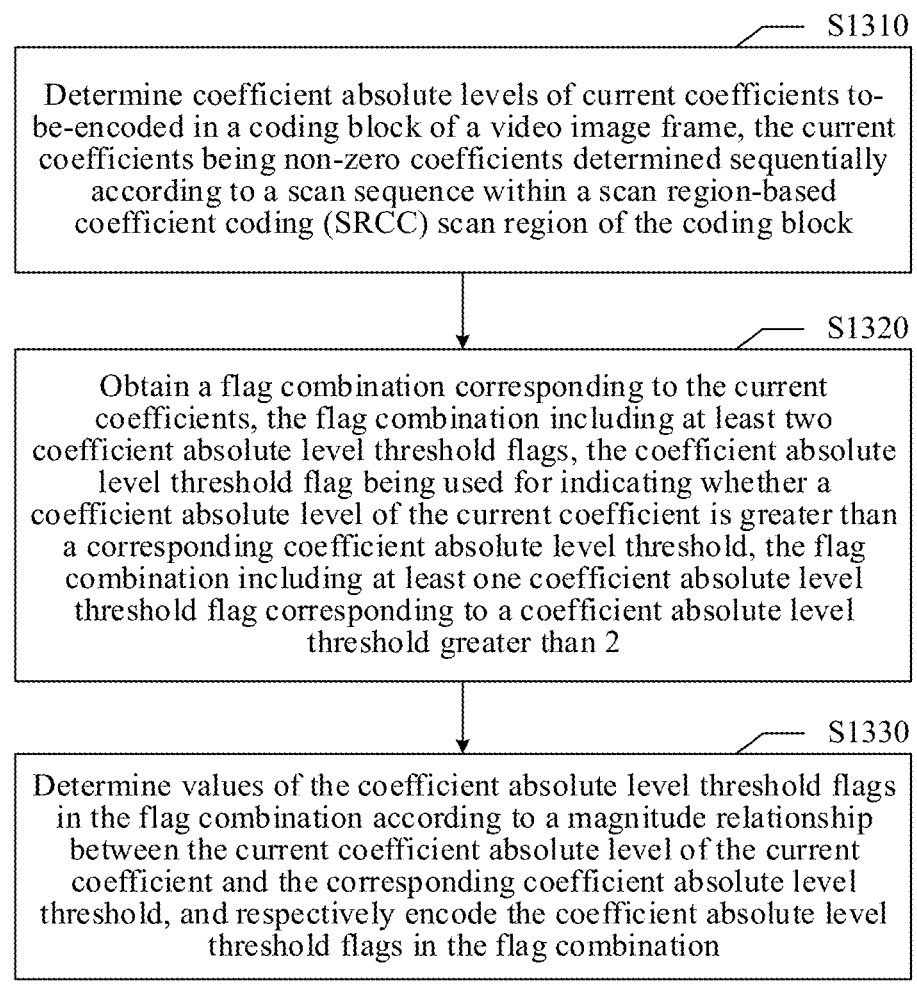
FIG. 13 is a schematic flowchart of steps of a video encoding method according to certain embodiment(s) of the present disclosure.

In the above embodiments, the solution of decoding non-zero coefficient absolute levels is described from the perspective of the decoder side. Encoding solution corresponding to the above embodiments may be used at the encoder side. FIG. 13 is a flowchart of steps of a video encoding method according to an embodiment of the present disclosure. The video coding method may be performed by a device having a computing processing function, for example, may be performed by a terminal device or a server. As shown in FIG. 13, the video encoding method may include the following steps S1310 to S1330.

Step S1310: Determine coefficient absolute levels of current coefficients to-be-encoded in a coding block of a video image frame, the current coefficients being non-zero coefficients determined sequentially according to a scan sequence within a scan region-based coefficient coding (SRCC) scan region of the coding block.

Step S1320: Obtain a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2.

Step S1330: Determine values of the coefficient absolute level threshold flags in the flag combination according to a magnitude relationship between the current coefficient absolute level of the current coefficient and the corresponding coefficient absolute level threshold, and respectively encode the coefficient absolute level threshold flags in the flag combination.

In an embodiment of the present disclosure, the values of the coefficient absolute level threshold flags in the flag combination may be sequentially determined in ascending order of the coefficient absolute level thresholds, and the coefficient absolute level threshold flags in the flag combination may be encoded respectively.

In an embodiment of the present disclosure, the flag combination includes n coefficient absolute level threshold flags corresponding to n non-consecutively increasing or partially consecutively increasing coefficient absolute level thresholds, n being an integer greater than or equal to two.

In an embodiment of the present disclosure, the n coefficient absolute level threshold flags include four coefficient absolute level threshold flags, and the four coefficient absolute level threshold flags include:
coeff_abs_level_greater1_flag;
coeff_abs_level_greater2_flag;
coeff_abs_level_greater4_flag; and
coeff_abs_level_greater8_flag.

In an embodiment of the present disclosure, the determining values of the coefficient absolute level threshold flags in the flag combination according to a magnitude relationship between the current coefficient absolute level of the current coefficient and the corresponding coefficient absolute level threshold, and respectively encoding the coefficient absolute level threshold flags in the flag combination includes: sequentially determining magnitude relationships between the coefficient absolute level of the current coefficient and the coefficient absolute level thresholds in ascending order of the coefficient absolute level thresholds; in response to the coefficient absolute level being not greater than a current coefficient absolute level threshold, setting a value of a current coefficient absolute level threshold flag to a preset second flag value of the coefficient absolute level threshold flag; setting the value of the current coefficient absolute level threshold flag to a preset first flag value in response to the coefficient absolute level being greater than the current coefficient absolute level threshold and not greater than a next coefficient absolute level threshold; and determining a base value corresponding to the current coefficient according to the current coefficient absolute level threshold, and determining a coefficient absolute level remaining value of the current coefficient according to the base value and the coefficient absolute level of the current coefficient.

In an embodiment of the present disclosure, the determining a coefficient absolute level remaining value of the current coefficient according to the base value and the coefficient absolute level of the current coefficient includes: subtracting the base value from the coefficient absolute level of the current coefficient to obtain a value of the coefficient absolute level remaining value; and performing binarization processing and entropy coding on the value of the coefficient absolute level remaining value to obtain the coefficient absolute level remaining value.

In an embodiment of the present disclosure, the performing binarization processing and entropy coding on the value of the coefficient absolute level remaining value to obtain the coefficient absolute level remaining value includes: determining a coefficient absolute level value range of the current coefficient according to the values of the coefficient absolute level threshold flags; selecting a target encoding method from a plurality of candidate encoding methods according to a range size of the coefficient absolute level value range; and performing the binarization processing and entropy coding on the value of the coefficient absolute level remaining value to obtain the coefficient absolute level remaining value according to the target encoding method.

In an embodiment of the present disclosure, the plurality of candidate encoding methods include one or more of: an encoding method based on truncated unary code; an encoding method based on unary code; an encoding method based on a fixed-length code of len bits; and an encoding method based on a k-order exponential Golomb code.

The relevant content details of the video encoding method in the embodiments of the present disclosure correspond to the video decoding method in the above embodiments, and will not be repeated here.

Based on the above embodiments, according to the characteristics and diversity of the residual distribution in different coding modes, the present disclosure proposes a method for encoding and decoding non-zero coefficient absolute levels. Syntax elements used in encoding and decoding non-zero coefficient absolute levels in the SRCC region are modified, to improve the binarization, encoding and coding methods for the non-zero coefficient absolute levels in the SRCC region, thereby improving the efficiency of coefficient coding and further improving the video compression performance.

Although the steps of the method in the present disclosure are described in a specific order in the accompanying drawings, this does not desire or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 14:
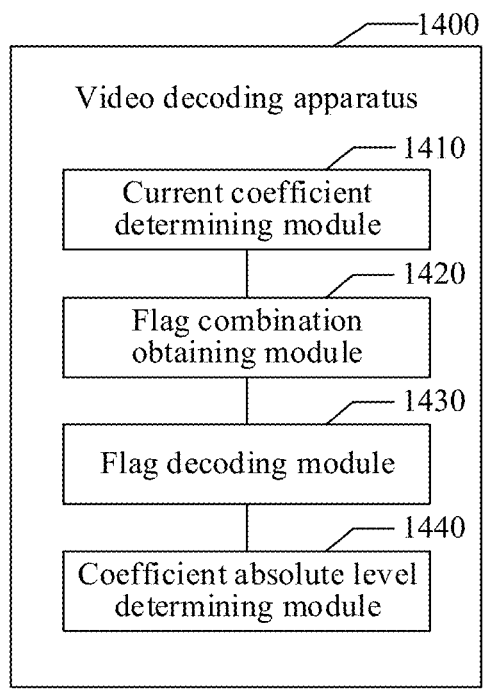
FIG. 14 is a schematic structural block diagram of a video decoding apparatus according to certain embodiment(s) of the present disclosure.

The following describes apparatus embodiments of the present disclosure, and the apparatus embodiments may be used for performing the video encoding and decoding methods in the embodiments of the present disclosure. FIG. 14 is a structural block diagram of a video decoding apparatus according to an embodiment of the present disclosure. As shown in FIG. 14, the video decoding apparatus 1400 may include: a current coefficient determining module 1410, configured to determine current coefficients to-be-decoded in a coding block of a video image frame, the current coefficients being non-zero coefficients determined sequentially according to a scan sequence within a scan region-based coefficient coding (SRCC) scan region of the coding block; a flag combination obtaining module 1420, configured to obtain a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2; a flag decoding module 1430, configured to respectively decode the coefficient absolute level threshold flags in the flag combination to obtain values of the coefficient absolute level threshold flags; and a coefficient absolute level determining module 1440, configured to determine the coefficient absolute levels of the current coefficients according to the values of the coefficient absolute level threshold flags.

In some embodiments of the present disclosure, based on the above technical solution, the flag combination includes n coefficient absolute level threshold flags corresponding to n consecutively increasing coefficient absolute level thresholds starting from one, n being an integer greater than or equal to three.

In some embodiments of the present disclosure, based on the above technical solution, the coefficient absolute level determining module 1440 includes: a first value obtaining unit configured to obtain the values of the coefficient absolute level threshold flags sequentially in ascending order of the coefficient absolute level thresholds; a first absolute level determining unit, configured to, in response to the value of a current coefficient absolute level threshold flag being a preset first flag value, determine the coefficient absolute level of the current coefficient according to a current coefficient absolute level threshold corresponding to the current coefficient absolute level threshold flag; a second value obtaining unit, configured to, in response to the value of the current coefficient absolute level threshold flag being a second flag value corresponding to the first flag value, continue to obtain the value of a next coefficient absolute level threshold flag; and a second absolute level determining unit, configured to, in response to the values of the coefficient absolute level threshold flags being all the second flag value, determine a base value corresponding to the current coefficient according to the coefficient absolute level threshold corresponding to a last coefficient absolute level threshold flag, and determine the coefficient absolute level of the current coefficient according to the base value and a coefficient absolute level remaining value of the current coefficient.

In some embodiments of the present disclosure, based on the above technical solution, the second absolute level determining unit includes: a remaining value decoding subunit, configured to perform entropy decoding and reverse binarization processing on the coefficient absolute level remaining value of the current coefficient to obtain a value of the coefficient absolute level remaining value; and an absolute level determining subunit configured to add the value of the coefficient absolute level remaining value and the base value to obtain the coefficient absolute level of the current coefficient.

In some embodiments of the present disclosure, based on the above technical solution, the remaining value decoding subunit is further configured to perform the entropy decoding and reverse binarization processing on the coefficient absolute level remaining value of the current coefficient based on a k-order exponential Golomb code.

In some embodiments of the present disclosure, based on the above technical solution, the flag combination includes n coefficient absolute level threshold flags corresponding to n non-consecutively increasing or partially consecutively increasing coefficient absolute level thresholds, n being an integer greater than or equal to two.

In some embodiments of the present disclosure, based on the above technical solution, the n coefficient absolute level threshold flags include four coefficient absolute level threshold flags, and the four coefficient absolute level threshold flags include:

coeff_abs_level_greater1_flag;
coeff_abs_level_greater2_flag;
coeff_abs_level_greater4_flag; and
coeff_abs_level_greater8_flag.

In some embodiments of the present disclosure, based on the above technical solution, the coefficient absolute level determining module 1440 includes: a third value obtaining unit configured to obtain the values of the coefficient absolute level threshold flags sequentially in ascending order of the coefficient absolute level thresholds; a third absolute level determining unit, configured to, in response to a value of a current coefficient absolute level threshold flag being a preset first flag value, determine a base value corresponding to the current coefficient according to a current coefficient absolute level threshold corresponding to the current coefficient absolute level threshold flag and a previous coefficient absolute level threshold corresponding to a previous coefficient absolute level threshold flag, and determine the coefficient absolute level of the current coefficient according to the base value and a coefficient absolute level remaining value of the current coefficient; a fourth value obtaining unit, configured to, in response to the value of the current coefficient absolute level threshold flag being a second flag value corresponding to the first flag value, continue to obtain the value of a next coefficient absolute level threshold flag; and a fourth absolute level determining unit, configured to, in response to the values of the coefficient absolute level threshold flags being all the second flag value, determine a base value corresponding to the current coefficient according to the coefficient absolute level threshold corresponding to a last coefficient absolute level threshold flag, and determine the coefficient absolute level of the current coefficient according to the base value and a coefficient absolute level remaining value of the current coefficient.

In some embodiments of the present disclosure, based on the above technical solution, the fourth absolute level determining unit includes: a remaining value decoding subunit, configured to perform entropy decoding and reverse binarization processing on the coefficient absolute level remaining value of the current coefficient to obtain a value of the coefficient absolute level remaining value; and an absolute level determining subunit configured to add the value of the coefficient absolute level remaining value and the base value to obtain the coefficient absolute level of the current coefficient.

In some embodiments of the present disclosure, based on the above technical solution, the remaining value decoding subunit is further configured to: determine a coefficient absolute level value range of the current coefficient according to the values of the coefficient absolute level threshold flags; select a target decoding method from a plurality of candidate decoding methods according to a range size of the coefficient absolute level value range; and perform the entropy decoding and reverse binarization processing on the coefficient absolute level remaining value of the current coefficient according to the target decoding method.

In some embodiments of the present disclosure, based on the above technical solution, the plurality of candidate decoding methods include at least one of following decoding methods: a decoding method based on truncated unary code; a decoding method based on unary code; a decoding method based on a fixed-length code of len bits; and a decoding method based on a k-order exponential Golomb code.

In some embodiments of the present disclosure, based on the above technical solution, the flag decoding module 1430 includes: a decoding manner determining unit, configured to respectively determine decoding modes corresponding to the coefficient absolute level threshold flags, the decoding mode including at least one of bypass decoding or regular decoding; a bypass decoding unit, configured to, in response to determining that the decoding method corresponding to the coefficient absolute level threshold flag is bypass decoding, input the coefficient absolute level threshold flag to a bypass decoding engine to decode the coefficient absolute level threshold flag through the bypass decoding engine; and a regular decoding unit, configured to, in response to determining that the decoding method corresponding to the coefficient absolute level threshold flag is regular decoding, input the coefficient absolute level threshold flag to a regular decoding engine based on a context model to decode the coefficient absolute level threshold flag through the regular decoding engine.

In some embodiments of the present disclosure, based on the above technical solution, the regular decoding unit includes: a model selection manner determining subunit, configured to determine a model selection manner corresponding to the coefficient absolute level threshold flag, the model selection manner including single model selection and dynamic model selection; a first assignment subunit, configured to assign a preset first value to a context index increment corresponding to the coefficient absolute level threshold flag in response to determining that the model selection manner corresponding to the coefficient absolute level threshold flag is single model selection; a second assignment subunit, configured to assign a value to the context index increment corresponding to the coefficient absolute level threshold flag according to attribute information related to the coding block and the current coefficient in response to determining that the model selection manner corresponding to the coefficient absolute level threshold flag is dynamic model selection; a model determining subunit, configured to determine a context model corresponding to the coefficient absolute level threshold according to the context index increment having the assigned value; and an arithmetic decoding subunit, configured to arithmetically decode the coefficient absolute level threshold flag based on the context model through the regular decoding engine.

In some embodiments of the present disclosure, based on the above technical solution, the second assignment subunit is further configured to: assign an initial value to the context index increment according to channel information of the coding block; determine a first incremental value according to the initial value and position information of the current coefficient within a scan region of the coding block; and determine a second incremental value according to the first incremental value and statistical information of decoded non-zero coefficients within the scan region of the coding block, and assign the second incremental value to the context index increment.

In some embodiments of the present disclosure, based on the above technical solution, the second assignment subunit is further configured to: assign a preset second value to the initial value of the context index increment in response to the coding block being a luma block; and assign a sum of the second value and a third value to the initial value of the context index increment in response to the coding block being a chroma block.

In some embodiments of the present disclosure, based on the above technical solution, the second assignment subunit is further configured to: determine the initial value as the first incremental value in response to the current coefficient being a first coefficient or a last coefficient scanned in the scan region of the coding block according to the scan sequence; and increase the initial value according to a relative position of the current coefficient in the scan region of the coding block to obtain the first incremental value in response to the current coefficient being a coefficient other than the first coefficient and the last coefficient in the scan region of the coding block.

In some embodiments of the present disclosure, based on the above technical solution, the second assignment subunit is further configured to: determine whether a predictive coding mode of the coding block is an ordinary intra prediction mode; in response to the predictive encoding mode being the ordinary intra prediction mode, divide the scan region into a first region number of local regions in an order from top left to bottom right, and increase the initial value to obtain the first incremental value according to the local region where the current coefficient is located; and in response to the predictive encoding mode being not the ordinary intra prediction mode, divide the scan region into a second region number of local regions in an order from top left to bottom right, and increase the initial value to obtain the first incremental value according to the local region where the current coefficient is located.

In some embodiments of the present disclosure, based on the above technical solution, the second assignment subunit is further configured to: calculate a statistical number of coefficients each corresponding to a coefficient absolute level greater than the coefficient absolute level threshold among first m non-zero coefficients that have been decoded in the scan region, m being a preset integer; and increase the first incremental value according to the statistical number to obtain the second incremental value.

Figure 15:
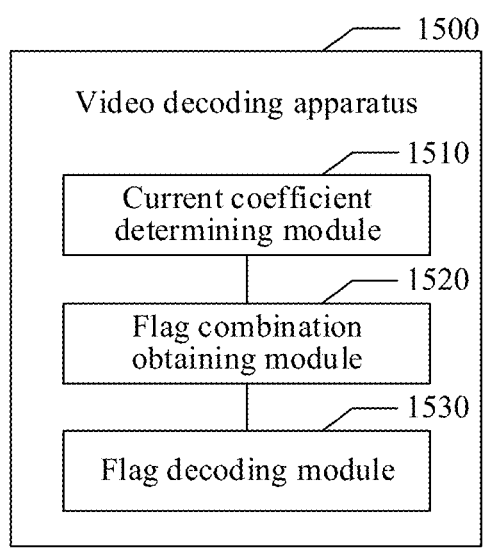
FIG. 15 is a schematic structural block diagram of a video encoding apparatus according to certain embodiment(s) of the present disclosure.

FIG. 15 is a structural block diagram of a video encoding apparatus according to an embodiment of the present disclosure. As shown in FIG. 15, the video encoding apparatus 1500 may include: a current coefficient determining module 1510, configured to determine coefficient absolute levels of current coefficients to-be-encoded in a coding block of a video image frame, the current coefficients being non-zero coefficients determined sequentially according to a scan sequence within a scan region-based coefficient coding (SRCC) scan region of the coding block; a flag combination obtaining module 1520, configured to obtain a flag combination corresponding to the current coefficients, the flag combination including at least two coefficient absolute level threshold flags, the coefficient absolute level threshold flag being used for indicating whether a coefficient absolute level of the current coefficient is greater than a corresponding coefficient absolute level threshold, the flag combination including at least one coefficient absolute level threshold flag corresponding to a coefficient absolute level threshold greater than 2; and a flag encoding module 1530, configured to determine values of the coefficient absolute level threshold flags in the flag combination according to a magnitude relationship between the current coefficient absolute level of the current coefficient and the corresponding coefficient absolute level threshold, and respectively encode the coefficient absolute level threshold flags in the flag combination.

In some embodiments of the present disclosure, based on the above technical solution, the flag combination includes n coefficient absolute level threshold flags corresponding to n non-consecutively increasing or partially consecutively increasing coefficient absolute level thresholds, n being an integer greater than or equal to two.

In some embodiments of the present disclosure, based on the above technical solution, the n coefficient absolute level threshold flags include four coefficient absolute level threshold flags, and the four coefficient absolute level threshold flags include: coeff_abs_level_greater1_flag; coeff_abs_level_ greater2_flag; coeff_abs_level_greater4_flag; and coeff_abs_level_greater8_flag.

In some embodiments of the present disclosure, based on the above technical solution, the flag encoding module 1530 is configured to: sequentially determine magnitude relationships between the coefficient absolute level of the current coefficient and the coefficient absolute level thresholds in ascending order of the coefficient absolute level thresholds; in response to the coefficient absolute level being not greater than a current coefficient absolute level threshold, set a value of a current coefficient absolute level threshold flag to a preset second flag value of the coefficient absolute level threshold flag; set the value of the current coefficient absolute level threshold flag to a preset first flag value in response to the coefficient absolute level being greater than the current coefficient absolute level threshold and not greater than a next coefficient absolute level threshold; and determine a base value corresponding to the current coefficient according to the current coefficient absolute level threshold, and determine a coefficient absolute level remaining value of the current coefficient according to the base value and the coefficient absolute level of the current coefficient.

In some embodiments of the present disclosure, based on the above technical solution, the flag encoding module 1530 is configured to: subtract the base value from the coefficient absolute level of the current coefficient to obtain a value of the coefficient absolute level remaining value; and perform binarization processing and entropy coding on the value of the coefficient absolute level remaining value to obtain the coefficient absolute level remaining value.

In some embodiments of the present disclosure, based on the above technical solution, the flag encoding module 1530 is configured to determine a coefficient absolute level value range of the current coefficient according to the values of the coefficient absolute level threshold flags; select a target encoding method from a plurality of candidate encoding methods according to a range size of the coefficient absolute level value range; and perform the binarization processing and entropy coding on the value of the coefficient absolute level remaining value to obtain the coefficient absolute level remaining value according to the target encoding method.

In some embodiments of the present disclosure, based on the above technical solution, the plurality of candidate encoding methods include at least one of following encoding methods: an encoding method based on truncated unary code; an encoding method based on unary code; an encoding method based on a fixed-length code of len bits; and an encoding method based on a k-order exponential Golomb code.

Details of the video decoding apparatus provided in the embodiments of the present disclosure have been described in detail in the corresponding method embodiments, and will not be repeated here.

Figure 16:
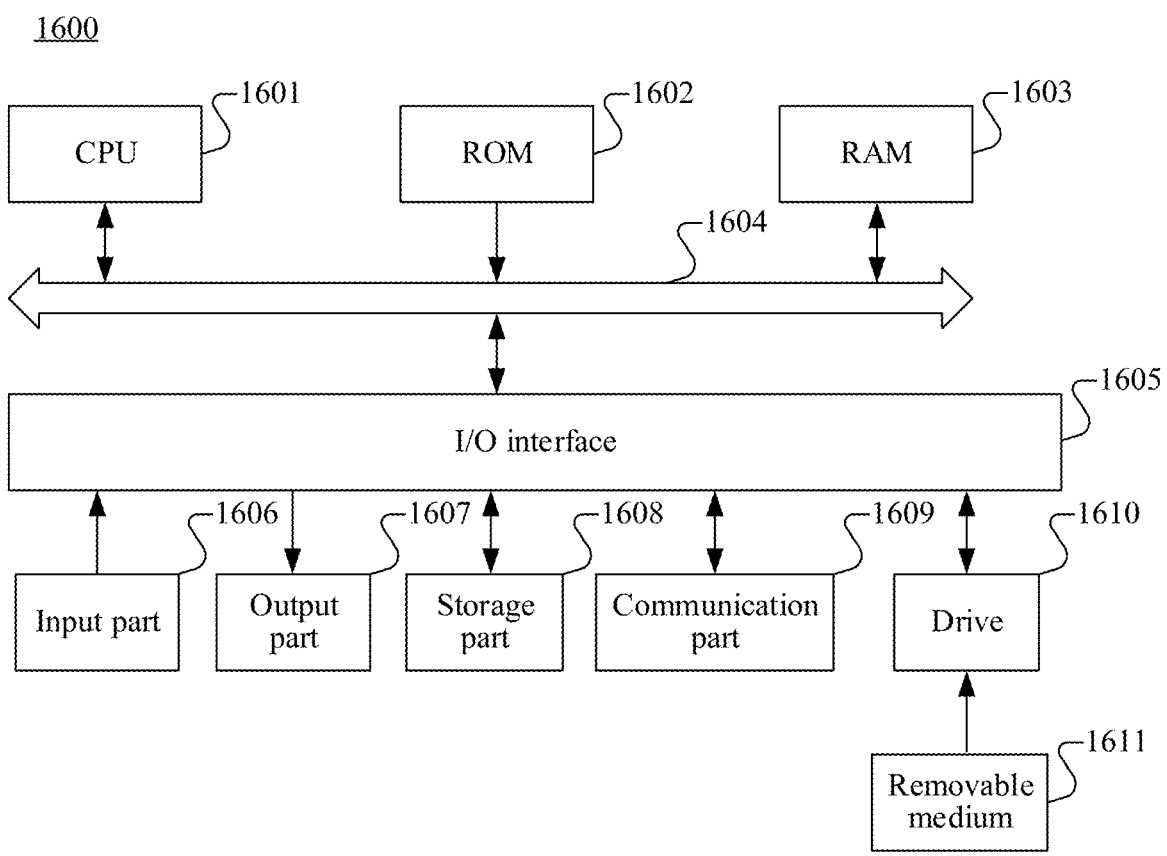
FIG. 16 is a schematic structural block diagram of a computer system of an electronic device according to certain embodiment(s) of the present disclosure.

FIG. 16 is a structural block diagram of a computer system of an electronic device adapted to implement an embodiment of the present disclosure.

The computer system 1600 of the electronic device shown in FIG. 16 is merely an example, and does not constitute any limitation on functions and use ranges of the embodiments of the present disclosure.

As shown in FIG. 16, the computer system 1600 includes a central processing unit (CPU) 1601. The CPU 1601 may perform various appropriate actions and processing according to a program stored in a read-only memory (ROM) 1602 or a program loaded from a storage part 1608 into a random access memory (RAM) 1603. The random access memory 1603 further stores various programs and data desired for system operations. The central processing unit 1601, the read-only memory 1602, and the random access memory 1603 are connected to each other via a bus 1604. An input/output (I/O) interface 1605 is also connected to the bus 1604.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The following components are connected to the input/output interface 1605: an input part 1606 including a keyboard and a mouse, etc.; an output part 1607 including a cathode ray tube (CRT), a liquid crystal display (LCD), a speaker, or the like; a storage part 1608 including hard disk, etc.; and a communication part 1609 including a network interface card such as a local area network card or a modem, etc. The communication part 1609 performs communication processing by using a network such as the Internet. A driver 1610 is also connected to the input/output interface 1605 as desired. A removable medium 1611, such as a magnetic disk, an optical disc, a magneto-optical disk, or a semiconductor memory, is mounted on the driver 1610 as desired, so that a computer program read from the removable medium is installed into the storage part 1608 as desired.

Particularly, according to the embodiments of the present disclosure, the processes described in the method flowcharts may be implemented as computer software programs. For example, the embodiments of the present disclosure include a computer program product, the computer program product including a computer program carried on a computer-readable medium, the computer program including a program code configured to perform the methods shown in the flowcharts. In such an embodiment, the computer program may be downloaded and installed from a network through the communication part 1609, and/or installed from the removable medium 1611. When the computer program is executed by the central processing unit 1601, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or device, or any combination thereof. More specific examples of the computer readable storage medium may include, but are not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, apparatus, or device. In the present disclosure, the computer-readable signal medium may include a data signal being in a baseband or transmitted as a part of a carrier, which carries computer-readable program code. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate or transmit a program that is used by or used in combination with an instruction execution system, apparatus or device. The program code included in the readable storage medium may be transmitted using any suitable medium, including but not limited to: a wireless medium, a wired medium, etc., or any suitable combination thereof.

The flowcharts and block diagrams in the accompanying drawings illustrate possible system architectures, functions, and operations that may be implemented by a system, a method, and a computer program product according to various embodiments of the present disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Although several modules or units of a device for action execution are mentioned in the detailed descriptions, the division is not mandatory. Actually, according to the implementations of the present disclosure, the features and functions of two or more modules or units described above may be specified in one module or unit. Conversely, the features and functions of one module or unit described above may be further divided into a plurality of modules or units to be embodied.

What is claimed is:

1. A video decoding method, comprising:
determining current coefficients to-be-decoded in a coding block of a video image frame, the current coefficients being non-zero coefficients determined according to a scan sequence within a scan region-based coefficient coding (SRCC) scan region of the coding block;
obtaining a flag combination corresponding to the current coefficients, wherein the flag combination includes n coefficient absolute level threshold flags corresponding to n non-consecutively increasing or partially consecutively increasing coefficient absolute level thresholds, n being an integer greater than or equal to two, each of the coefficient absolute level threshold flags indicating whether a coefficient absolute level of the current coefficient is greater than a corresponding coefficient absolute level threshold, the flag combination including at least one coefficient absolute level threshold flag corresponding to a coefficient absolute level threshold greater than 2;
decoding the coefficient absolute level threshold flags in the flag combination to obtain values of the coefficient absolute level threshold flags; and
determining the coefficient absolute levels of the current coefficients according to the values of the coefficient absolute level threshold flags,
wherein determining the coefficient absolute levels comprises:
obtaining the values of the coefficient absolute level threshold flags sequentially in ascending order of the coefficient absolute level thresholds;
based on a value of a current coefficient absolute level threshold flag being a preset first flag value, determining a base value corresponding to the current coefficient according to a current coefficient absolute level threshold corresponding to the current coefficient absolute level threshold flag and a previous coefficient absolute level threshold corresponding to a previous coefficient absolute level threshold flag, and determining the coefficient absolute level of the current coefficient according to the base value and a coefficient absolute level remaining value of the current coefficient, the base value being greater than the previous coefficient absolute level threshold when the current coefficient absolute level threshold flag is not corresponding to a smallest coefficient absolute level threshold in the flag combination;

based on the value of the current coefficient absolute level threshold flag being a second flag value corresponding to the first flag value, continuing to obtain the value of a next coefficient absolute level threshold flag; and based on the values of the coefficient absolute level threshold flags being all the second flag value, determining a base value corresponding to the current coefficient according to the coefficient absolute level threshold corresponding to a last coefficient absolute level threshold flag, and determining the coefficient absolute level of the current coefficient according to the base value and a coefficient absolute level remaining value of the current coefficient.

2. The video decoding method according to claim 1, wherein the n coefficient absolute level threshold flags include four coefficient absolute level threshold flags.

3. The video decoding method according to claim 1, wherein determining the coefficient absolute level comprises:

performing entropy decoding and reverse binarization processing on the coefficient absolute level remaining value of the current coefficient to obtain a value of the coefficient absolute level remaining value; and adding the value of the coefficient absolute level remaining value and the base value to obtain the coefficient absolute level of the current coefficient.

4. The video decoding method according to claim 3, wherein performing the entropy decoding and reverse binarization processing comprises:

determining a coefficient absolute level value range of the current coefficient according to the values of the coefficient absolute level threshold flags;

selecting a target decoding method from a plurality of candidate decoding methods according to a range size of the coefficient absolute level value range; and performing the entropy decoding and reverse binarization processing on the coefficient absolute level remaining value of the current coefficient according to the target decoding method.

5. The video decoding method according to claim 4, wherein the plurality of candidate decoding methods include one or more of:

a decoding method based on truncated unary code;
a decoding method based on unary code;
a decoding method based on a fixed-length code of len bits; and
a decoding method based on a k-order exponential Golomb code.

6. The video decoding method according to claim 1, wherein decoding the coefficient absolute level threshold flags comprises:

determining decoding modes corresponding to the coefficient absolute level threshold flags, the decoding mode including one or both of bypass decoding and regular decoding;

based on determining that the decoding method corresponding to the coefficient absolute level threshold flag is bypass decoding, inputting the coefficient absolute level threshold flag to a bypass decoding engine to decode the coefficient absolute level threshold flag through the bypass decoding engine; and based on determining that the decoding method corresponding to the coefficient absolute level threshold flag is regular decoding, inputting the coefficient absolute level threshold flag to a regular decoding engine based on a context model to decode the coefficient absolute level threshold flag through the regular decoding engine.

7. The video decoding method according to claim 6, wherein decoding the coefficient absolute level threshold flag comprises:

determining a model selection manner corresponding to the coefficient absolute level threshold flag, the model selection manner comprising single model selection and dynamic model selection;

assigning a preset first value to a context index increment corresponding to the coefficient absolute level threshold flag based on determining that the model selection manner corresponding to the coefficient absolute level threshold flag is single model selection;

assigning a value to the context index increment corresponding to the coefficient absolute level threshold flag according to attribute information related to the coding block and the current coefficient based on determining that the model selection manner corresponding to the coefficient absolute level threshold flag is dynamic model selection;

determining a context model corresponding to the coefficient absolute level threshold according to the context index increment having the assigned value; and arithmetically decoding the coefficient absolute level threshold flag based on the context model through the regular decoding engine.

8. The video decoding method according to claim 7, wherein assigning the value to the context index increment comprises:

assigning an initial value to the context index increment according to channel information of the coding block;

determining a first incremental value according to the initial value and position information of the current coefficient within a scan region of the coding block; and determining a second incremental value according to the first incremental value and statistical information of decoded non-zero coefficients within the scan region of the coding block, and assigning the second incremental value to the context index increment.

9. The video decoding method according to claim 8, wherein assigning the initial value comprises:

assigning a preset second value to the initial value of the context index increment based on the coding block being a luma block; and assigning a sum of the second value and a third value to the initial value of the context index increment based on the coding block being a chroma block.

10. The video decoding method according to claim 9, wherein determining the first incremental value comprises:

determining the initial value as the first incremental value based on the current coefficient being a first coefficient or a last coefficient scanned in the scan region of the coding block according to the scan sequence; and increasing the initial value according to a relative position of the current coefficient in the scan region of the coding block to obtain the first incremental value based on the current coefficient being a coefficient other than the first coefficient and the last coefficient in the scan region of the coding block.

11. The video decoding method according to claim 10, wherein increasing the initial value comprises:

determining whether a predictive coding mode of the coding block is an ordinary intra prediction mode;

based on the predictive encoding mode being the ordinary intra prediction mode, dividing the scan region into a first region number of local regions in an order from top left to bottom right, and increasing the initial value to obtain the first incremental value according to the local region where the current coefficient is located; and based on the predictive encoding mode being not the ordinary intra prediction mode, dividing the scan region into a second region number of local regions in an order from top left to bottom right, and increasing the initial value to obtain the first incremental value according to the local region where the current coefficient is located.

12. The video decoding method according to claim 8, wherein determining the second incremental value comprises:

calculating a statistical number of coefficients each corresponding to a coefficient absolute level greater than the coefficient absolute level threshold among first m non-zero coefficients that have been decoded in the scan region, m being a preset integer; and increasing the first incremental value according to the statistical number to obtain the second incremental value.

13. A video decoding apparatus, the apparatus comprising: a memory storing computer program instructions; and a processor coupled to the memory and configured to execute the computer program instructions and perform:

determining current coefficients to-be-decoded in a coding block of a video image frame, the current coefficients being non-zero coefficients determined according to a scan sequence within a scan region-based coefficient coding (SRCC) scan region of the coding block;

obtaining a flag combination corresponding to the current coefficients, wherein the flag combination includes n coefficient absolute level threshold flags corresponding to n non-consecutively increasing or partially consecutively increasing coefficient absolute level thresholds, n being an integer greater than or equal to two, each of the coefficient absolute level threshold flags indicating whether a coefficient absolute level of the current coefficient is greater than a corresponding coefficient absolute level threshold, the flag combination including at least one coefficient absolute level threshold flag corresponding to a coefficient absolute level threshold greater than 2;

decoding the coefficient absolute level threshold flags in the flag combination to obtain values of the coefficient absolute level threshold flags; and determining the coefficient absolute levels of the current coefficients according to the values of the coefficient absolute level threshold flags, wherein determining the coefficient absolute levels comprises:

obtaining the values of the coefficient absolute level threshold flags sequentially in ascending order of the coefficient absolute level thresholds;

based on a value of a current coefficient absolute level threshold flag being a preset first flag value, determining a base value corresponding to the current coefficient according to a current coefficient absolute level threshold corresponding to the current coefficient absolute level threshold flag and a previous coefficient absolute level threshold corresponding to a previous coefficient absolute level threshold flag, and determining the coefficient absolute level of the current coefficient according to the base value and a coefficient absolute level remaining value of the current coefficient, the base value being greater than the previous coefficient absolute level threshold when the current coefficient absolute level threshold flag is not corresponding to a smallest coefficient absolute level threshold in the flag combination;

based on the value of the current coefficient absolute level threshold flag being a second flag value corresponding to the first flag value, continuing to obtain the value of a next coefficient absolute level threshold flag; and based on the values of the coefficient absolute level threshold flags being all the second flag value, determining a base value corresponding to the current coefficient according to the coefficient absolute level threshold corresponding to a last coefficient absolute level threshold flag, and determining the coefficient absolute level of the current coefficient according to the base value and a coefficient absolute level remaining value of the current coefficient.

14. A non-transitory computer-readable storage medium storing bitstreams and computer program instructions executable by at least one processor to perform:

determining current coefficients to-be-decoded in a coding block of a video image frame, the current coefficients being non-zero coefficients determined according to a scan sequence within a scan region-based coefficient coding (SRCC) scan region of the coding block;

obtaining a flag combination corresponding to the current coefficients, the flag combination including n coefficient absolute level threshold flags corresponding to n consecutively increasing or partially consecutively increasing coefficient absolute level thresholds, n being an integer greater than or equal to two, each of the coefficient absolute level threshold flags indicating whether a coefficient absolute level of the current coefficient is greater than a corresponding coefficient absolute level threshold, the flag combination including at least one coefficient absolute level threshold flag corresponding to a coefficient absolute level threshold greater than 2;

decoding the coefficient absolute level threshold flags in the flag combination to obtain values of the coefficient absolute level threshold flags; and determining the coefficient absolute levels of the current coefficients according to the values of the coefficient absolute level threshold flags, wherein determining the coefficient absolute levels comprises:

obtaining the values of the coefficient absolute level threshold flags in ascending order of the coefficient absolute level thresholds;

based on the value of a current coefficient absolute level threshold flag being a preset first flag value, determining a base value corresponding to the current coefficient according to a current coefficient absolute level threshold corresponding to the current coefficient absolute level threshold flag and a previous coefficient absolute level threshold corresponding to a previous coefficient absolute level threshold flag, and determining the coefficient absolute level of the current coefficient according to the base value and a coefficient absolute level remaining value of the current coefficient, the base value being greater than the previous coefficient absolute level threshold when the current coefficient absolute level threshold flag is not corresponding to a smallest coefficient absolute level threshold in the flag combination;

based on the value of the current coefficient absolute level threshold flag being a second flag value corresponding to the first flag value, continuing to obtain the value of a next coefficient absolute level threshold flag; and based on the values of the coefficient absolute level threshold flags being all the second flag value, determining a base value corresponding to the current coefficient according to the coefficient absolute level threshold corresponding to a last coefficient absolute level threshold flag, and determining the coefficient absolute level of the current coefficient according to the base value and a coefficient absolute level remaining value of the current coefficient.

* * * * *